US010859595B2

(12) United States Patent
Kommi et al.

(10) Patent No.: US 10,859,595 B2
(45) Date of Patent: Dec. 8, 2020

(54) SYSTEMS AND METHODS FOR IMPROVING LOCATION ACCURACY FOR A MOBILE DEVICE USING SENSORS

(71) Applicant: QUALCOMM Incorporated, San Diego, CA (US)

(72) Inventors: Mahesh Kommi, San Diego, CA (US); Stephen William Edge, Escondido, CA (US); Guttorm Opshaug, Redwood City, CA (US); Sven Fischer, Nuremberg (DE); Rahul Kashyap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 15/713,299

(22) Filed: Sep. 22, 2017

(65) Prior Publication Data
US 2018/0284149 A1 Oct. 4, 2018

Related U.S. Application Data

(60) Provisional application No. 62/481,317, filed on Apr. 4, 2017, provisional application No. 62/502,649, filed on May 6, 2017.

(51) Int. Cl.
*G01P 15/08* (2006.01)
*G01C 21/16* (2006.01)
(Continued)

(52) U.S. Cl.
CPC ............ *G01P 15/08* (2013.01); *G01C 21/165* (2013.01); *G01S 5/0036* (2013.01); *G01S 5/0263* (2013.01); *G01S 19/49* (2013.01)

(58) Field of Classification Search
CPC ................................ G01P 15/08; G01C 21/16
See application file for complete search history.

(56) References Cited

U.S. PATENT DOCUMENTS

| 9,507,027 B2 | 11/2016 | Edge et al. |
| 2006/0089786 A1* | 4/2006 | Soehren ............... G01C 21/20 701/541 |

(Continued)

FOREIGN PATENT DOCUMENTS

WO    2006014170 A1    2/2006

OTHER PUBLICATIONS

International Search Report and Written Opinion—PCT/US2018/018045—ISA/EPO—dated Jun. 5, 2018.

*Primary Examiner* — Kira Nguyen
(74) *Attorney, Agent, or Firm* — Thien T. Nguyen

(57) ABSTRACT

Techniques described herein may enable more accurate location of a user equipment (UE) that may be subject to movement or velocity. The UE may obtain, during a period of time, location-related measurements of RF signals received at the UE, where the location-related measurements are indicative of a location of the UE during the period of time; The UE may also obtain, using sensors of the UE, velocity-related measurements indicative of a movement or velocity of the UE during the period of time. The UE may send the location-related measurements and the velocity-related measurements to a location server, which may compute a location of the UE based on the measurements. The location computation may allow for movement of the UE during the period of time.

27 Claims, 9 Drawing Sheets

(51) Int. Cl.
    *G01S 19/49*     (2010.01)
    *G01S 5/02*     (2010.01)
    *G01S 5/00*     (2006.01)

(56) References Cited

U.S. PATENT DOCUMENTS

| | | | |
|---|---|---|---|
| 2010/0211301 A1* | 8/2010 | McClellan | G08G 1/0104 |
| | | | 701/119 |
| 2013/0090881 A1* | 4/2013 | Janardhanan | G01C 22/006 |
| | | | 702/104 |
| 2013/0166246 A1* | 6/2013 | Rousu | G01S 5/0036 |
| | | | 702/141 |
| 2015/0045061 A1* | 2/2015 | Da | H04W 4/023 |
| | | | 455/456.2 |
| 2015/0133152 A1* | 5/2015 | Edge | G01S 5/0036 |
| | | | 455/456.1 |
| 2015/0334678 A1* | 11/2015 | MacGougan | G01S 19/22 |
| | | | 701/451 |
| 2017/0142756 A1* | 5/2017 | Lee | H04W 76/45 |
| 2018/0120444 A1* | 5/2018 | Young | G01S 19/24 |
| 2019/0088100 A1* | 3/2019 | Shapiro | H04W 4/02 |
| 2019/0098441 A1* | 3/2019 | Cerchio | H04W 4/33 |

\* cited by examiner

SYSTEMS AND METHODS FOR IMPROVING LOCATION ACCURACY FOR A MOBILE DEVICE USING SENSORS

RELATED APPLICATIONS

This application claims the benefit of U.S. Provisional Application No. 62/481,317, filed Apr. 4, 2017, entitled "IMPROVING LOCATION ACCURACY FOR MOBILE DEVICES USING SENSORS," and U.S. Provisional Application No. 62/502,649, filed May 6, 2017, entitled "IMPROVING LOCATION ACCURACY FOR MOBILE DEVICES USING SENSORS," both of which are assigned to the assignee hereof, and incorporated by reference herein in their entirety.

BACKGROUND

Background Field

The subject matter disclosed herein relates to wireless communications systems, and more particularly to systems and methods for position location of a user equipment in a wireless communications system using sensors.

Relevant Background

It is often desirable to know the location of a mobile device such as a cellular phone. For example, a location services (LCS) client may desire to know the location of a mobile device in the case of an emergency services call or to provide some service to the user of the mobile device such as navigation assistance or direction finding.

In Observed Time Difference of Arrival (OTDOA) based positioning, a mobile device may measure time differences between downlink (DL) signals received from a plurality of base stations. Because the positions of the base stations can be known, the observed time differences between DL signals received from the base stations may be used to calculate the location of the mobile device (e.g. using multilateration techniques). In OTDOA, the mobile device typically measures the time of arrival (TOA) of DL signals received from a reference cell (e.g., the serving cell) and one or more neighboring cells. The TOA for the reference cell is subtracted from the TOA for each of the neighbor cells (or the reverse) to determine a Reference Signal Time Difference (RSTD) between the reference cell and each neighbor cell. These RSTD measurements may be sent to a location server, which can use the measurements along with the absolute or relative transmission timing of each cell, and the known position(s) of the base station physical transmitting antennas for the reference and neighboring cells, to calculate the mobile device's position. These position calculations, however, may not take into consideration any movement of the mobile device (e.g. a velocity of the mobile device) while measurements are obtained, which may degrade the position determination. Similar degradation of location caused by movement of a mobile device may also apply to other position methods. Techniques to overcome such degradation may therefore be beneficial.

SUMMARY

Techniques provided herein address these and other issues by employing sensors of a mobile device to deliver movement-related information to a location server applicable to a time period when the mobile device is obtaining location measurements. The location server can then use the movement-related information to improve the accuracy of a location derived from other position methods and/or an estimate of uncertainty or error in the resulting location.

An example method of determining a location of a user equipment (UE), according to the description, comprises obtaining at the UE, during a period of time, one or more location-related measurements of one or more Radio Frequency (RF) signals received at the UE, the one or more location-related measurements indicative of a location of the UE during the period of time. The method further comprises obtaining, using one or more inertial sensors of the UE, one or more velocity-related measurements indicative of a velocity of the UE during the period of time, and sending location information from the UE to a remote entity, the location information comprising information indicative of the one or more location-related measurements, and the one or more velocity-related measurements.

The method may include one or more the following features. The remote entity may comprise a location server. The information indicative of the one or more velocity-related measurements may comprise an indication of at least one of a straight-line distance traveled by the UE during the period of time, an average velocity for the UE during the period of time, a change in velocity for the UE during the period of time, an initial velocity for the UE at the beginning of the period of time, a final velocity for the UE at the end of the period of time, an instantaneous velocity for the UE during the period of time, an instantaneous acceleration for the UE during the period of time, or a trajectory for the UE during the period of time, or any combination thereof. The indication of the straight-line distance may comprise a velocity vector. The indication of the change in velocity of the UE during the period of time may comprise an indication of a difference between a velocity of the UE at the beginning of the period of time and a velocity of the UE at the end of the period of time. The indication of an instantaneous velocity for the UE during the period of time and the indication of an instantaneous acceleration for the UE during the period of time may be for a time at which a location-related measurement of the one or more location-related measurements was obtained. The information indicative of the one or more location-related measurements further may comprise at least one of the period of time, a time at which each location-related measurement of the one or more location-related measurements was obtained, or an indication of time source for the UE during the period of time. The indication of the time source for the UE during the period of time may comprise an indication of a serving cell for the UE or an indication of a reference cell for the UE. The one or more location-related measurements may comprise measurements of an observed time difference of arrival (OTDOA), a reference signal time difference (RSTD), a time of arrival (TOA), a round trip signal propagation time (RTT), a pseudorange, an angle of arrival (AOA), a received signal strength indication (RSSI), or any combination thereof.

An example method of determining a location of a UE, according to the description, comprises receiving, at a location server, location information from the UE. The location information comprises information indicative of one or more location-related measurements of one or more Radio Frequency (RF) signals obtained by the UE during a period of time, and one or more velocity-related measurements obtained by the UE using one or more inertial sensors of the UE and indicative of a velocity of the UE during the period of time. The method further comprises determining, by the location server, a location of the UE based, at least in part, on the information indicative of the one or more location-related measurements and the one or more velocity-related measurements.

The method may comprise one or more of the following features. The information indicative of the one or more velocity-related measurements may comprise an indication at least one of a straight-line distance traveled by the UE during the period of time, an average velocity for the UE during the period of time, a change in velocity for the UE during the period of time, an initial velocity for the UE at the beginning of the period of time, a final velocity for the UE at the end of the period of time, an instantaneous velocity for the UE during the period of time, an instantaneous acceleration for the UE during the period of time, a trajectory for the UE during the period of time, or some combination thereof. The indication of the straight-line distance may comprise a velocity vector. The indication of a change in velocity of the UE during the period of time may comprise an indication of a difference between a velocity of the UE at the beginning of the period of time and a velocity of the UE at the end of the period of time. The indication of an instantaneous velocity for the UE during the period of time and the indication of an instantaneous acceleration for the UE during the period of time may be for a time at which a location-related measurement of the one or more location-related measurements was obtained by the UE. The information indicative of the one or more location-related measurements further may comprise timing information, comprising at least one of the period of time, a time at which each location-related measurement of the one or more location-related measurements was obtained by the UE, or an indication of a time source for the UE during the period of time, and determining the location of the UE may be further based, at least in part, on the timing information. Determining the location may comprise extrapolating the location of the UE for a previous time to a current time, including relative locations of the UE when different location-related measurements were obtained, including relative changes in timing for the UE based on movement towards or away from a time source, calculating an expected error or uncertainty in the location for the UE, or performing some combination thereof. The one or more location-related measurements may comprise measurements of an observed time difference of arrival (OTDOA), a reference signal time difference (RSTD), a time of arrival (TOA), a round trip signal propagation time (RTT), a pseudorange, an angle of arrival (AOA), a received signal strength indication (RSSI), or any combination thereof. The method may further comprise sending to the UE, a request for the information indicative of the one or more location-related measurements and the one or more velocity-related measurements.

An example UE, according to the description, comprises a wireless communication interface, one or more inertial sensors, and one or more processing units communicatively coupled with the wireless communication interface and the one or more inertial sensors. The one or more processing units is configured to cause the UE to obtain, via the wireless communication interface during a period of time, one or more location-related measurements of one or more Radio Frequency (RF) signals, the one or more location-related measurements indicative of a location of the UE during the period of time. The one or more processing units is further configured to obtain, using the one or more inertial sensors, one or more velocity-related measurements indicative of a velocity of the UE during the period of time, and send location information via the wireless communication interface to a remote entity, the location information comprising information indicative of the one or more location-related measurements, and the one or more velocity-related measurements.

The UE may be further configured for one or more the following features. The information indicative of the one or more velocity-related measurements may include an indication of at least one of a straight-line distance traveled by the UE during the period of time, an average velocity for the UE during the period of time, a change in velocity for the UE during the period of time, an initial velocity for the UE at the beginning of the period of time, a final velocity for the UE at the end of the period of time, an instantaneous velocity for the UE during the period of time, an instantaneous acceleration for the UE during the period of time, or a trajectory for the UE during the period of time, or any combination thereof. The indication of the straight-line distance may include a velocity vector. The indication of the change in velocity of the UE during the period of time may include an indication of a difference between a velocity of the UE at the beginning of the period of time and a velocity of the UE at the end of the period of time. The information indicative of the one or more location-related measurements may include at least one of the period of time, a time at which each location-related measurement of the one or more location-related measurements was obtained, or an indication of time source for the UE during the period of time. The indication of the time source for the UE during the period of time may include an indication of a serving cell for the UE or an indication of a reference cell for the UE.

An example location server, according to the description, comprises a communication interface, a memory, and one or more processing units communicatively coupled with the communication interface and the memory. The one or more processing units is configured to cause the location server to receive, via the communication interface, location information from a user equipment (UE). The location information comprises information indicative of one or more location-related measurements of one or more Radio Frequency (RF) signals obtained by the UE during a period of time, and one or more velocity-related measurements obtained by the UE using one or more inertial sensors of the UE and indicative of a velocity of the UE during the period of time. The one or more processing units is further configured to cause a location server to determine a location of the UE based, at least in part, on the information indicative of the one or more location-related measurements and the one or more velocity-related measurements.

The location server may be further configured for one or more of the following features. The information indicative of the one or more velocity-related measurements may comprise an indication of at least one of a straight-line distance traveled by the UE during the period of time, an average velocity for the UE during the period of time, a change in velocity for the UE during the period of time, an initial velocity for the UE at the beginning of the period of time, a final velocity for the UE at the end of the period of time, an instantaneous velocity for the UE during the period of time, an instantaneous acceleration for the UE during the period of time, a trajectory for the UE during the period of time, or any combination thereof. The one or more processing units may be further configured to determine the location of the UE further based on timing information included in the information indicative of the one or more location-related measurements, the timing information comprising at least one of the period of time, a time at which each location-related measurement of the one or more location-related measurements was obtained by the UE, or an indication of a time source for the UE during the period of time. The one or more processing units may be configured to determine the location of the UE by being further configured to extrapolate the location of the UE for a previous time to a current time, include relative locations of the UE when different location-related measurements were obtained, include relative changes in timing for the UE based on movement towards or away from a time source, calculate an expected error or uncertainty in the location for the UE, or perform some combination thereof. The one or more processing units further may be configured to cause the location server to determine the location of the UE from an observed time difference of arrival (OTDOA), a reference signal time difference (RSTD), a time of arrival (TOA), a round trip signal propagation time (RTT), a pseudorange, an angle of arrival (AOA), a received signal strength indication (RSSI), or some combination of these. The one or more processing units may be further configured to cause the location server to send to the UE, via the communication interface, a request for the information indicative of the one or more location-related measurements and the one or more velocity-related measurements.

BRIEF DESCRIPTION OF DRAWINGS

Non-limiting and non-exhaustive aspects are described with reference to the following figures, wherein like reference numerals refer to like parts and like elements throughout the various figures unless otherwise specified.

DETAILED DESCRIPTION

Figure 1:
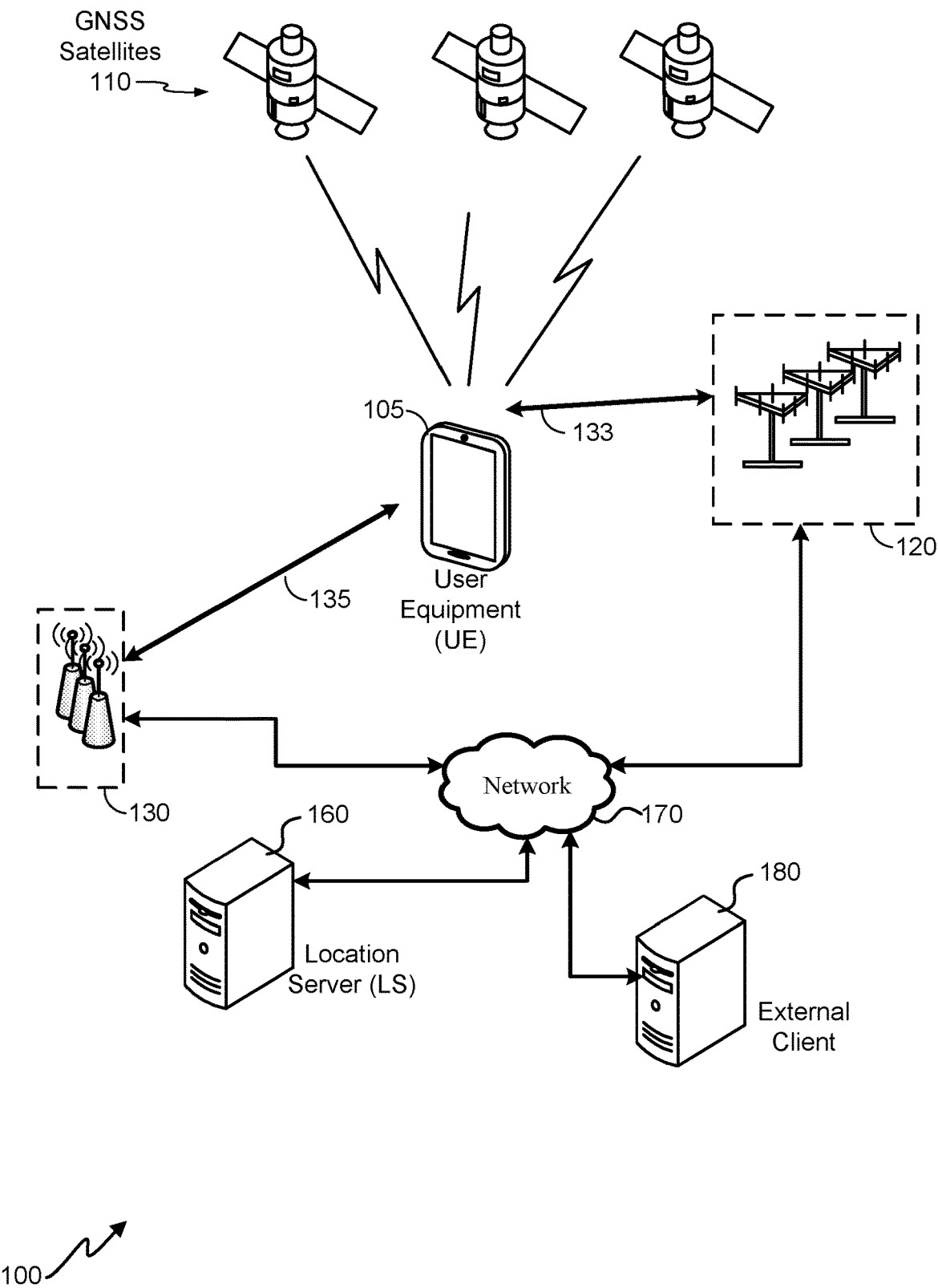
FIG. 1 is a simplified illustration of a communication system, according to an embodiment, that may use the techniques provided herein for improving the accuracy of an estimated location of a user equipment (UE).

Some example techniques are presented herein which may be implemented at a mobile device or mobile station (referred to herein as a user equipment, or "UE"), a location server (LS), and/or at other device(s) to provide increased accuracy of a position determination for a UE. These techniques can be utilized in a variety of applications utilizing various technologies and/or standards, including, the Long Term Evolution (LTE) Positioning Protocol (LPP) defined by the 3rd Generation Partnership Project (3GPP), the LPP Extensions (LPPe) protocol defined by the Open Mobile Alliance (OMA), and/or positioning for 802.11 Wi-Fi® defined by the Institute of Electrical and Electronics Engineers (IEEE).

A UE may comprise a mobile device such as, a mobile phone, smartphone, tablet or other mobile computer, a portable gaming device, a personal media player, a personal navigation device, a wearable device, an in-vehicle device, or other electronic device. Position determination of a UE may be useful to the UE and/or other entities in a wide variety of scenarios, e.g. such as for personal navigation, asset and person tracking, and in association with an emergency call. There are many methods already known to determine an estimated position of the UE, including methods that involve communicating measurement and/or other information between the UE and an LS. However, these position methods do not always include an indication of movement of the UE (e.g. a velocity of the UE), which may degrade the position determination in one or more different ways.

One way in which movement (e.g. velocity) of a UE may degrade a position determination for the UE is that location-related measurements obtained by or on behalf of the UE and used to determine a position of the UE may not be obtained for a single position of the UE. More specifically, a position determination may be based on multiple position measurements (e.g., of Observed Time Difference Of Arrival (OTDOA) Reference Signal Time Difference (RSTD), Global Navigation Satellite System (GNSS) code phase, GNSS pseudorange, Round Trip signal propagation Time (RTT), etc.), which may be obtained during a period of time (e.g. 15 to 30 seconds in some scenarios), rather than all at the same time. For a moving UE, this can mean that different measurements may correspond with different locations of the UE. Thus, depending on the sequence of obtaining different measurements, the final location estimate may vary and may have an associated uncertainty or error.

In addition, even if it were possible to compensate for time effects in different measurements (e.g. by adjusting each measurement to a measurement that would have been obtained at a common time and for the same UE location), the location of the UE could still be in error due to the delay between the time the measurements were obtained or adjusted (e.g., at the adjusted common time) and the time the location estimate is determined. For example, for a UE moving in a straight line at 30 meters per second (67 mph), a 10-second delay in determining the location of the UE would result in a location determination that is in error by 300 meters (984 feet) at the time the location is determined. These types of inaccuracies can result in, among other things, poor performance by applications and/or other services that depend on an accurate location.

Techniques provided herein address these and other issues by employing sensors in a UE to deliver movement related information to an LS applicable to a time period when the UE is obtaining location measurements. The LS can then use the movement related information to improve the accuracy of a location derived from other position methods and/or an estimate of uncertainty or error in the resulting location.

FIG. 1 is a simplified illustration of a communication system 100 in which a user equipment (UE) 105, location server (LS) 160, and/or other components of the communication system 100 can use the techniques provided herein for improving the accuracy of an estimated location of UE 105, according to an embodiment. The techniques described herein may be implemented by one or more components of the communication system 100. The communication system 100 can include a UE 105, one or more satellites 110 for a GNSS (also referred to as GNSS space vehicles (SVs)), base stations 120, access points (APs) 130, LS 160, network 170, and external client 180.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger or smaller number of base stations 120 and/or APs 130 than illustrated in FIG. 1. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Particular examples of network 170 include a Long Term Evolution (LTE) wireless network, a Fifth Generation (5G) wireless network (also referred to as New Radio (NR) wireless network), a Wi-Fi wireless local area network (WLAN) and the Internet. LTE, 5G and NR are wireless technologies defined, or being defined, by the $3^{rd}$ Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), or the like. An AP 130 may comprise a Wi-Fi AP or a Bluetooth® AP. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE access by UE 105. The LS 160 may further comprise a Location Management Function (LMF) that supports location of UE 105 using a control plane (CP) location solution for 5G or NR access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g. data transported using the Internet Protocol (IP) and/or Transmission Control Protocol (TCP)) from the perspective of network 170.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Techniques herein for improving location accuracy of UE 105 can be implemented in scenarios in which UE 105 provides location-related measurements to LS 160 for location determination. Location-related measurements obtained by UE 105 and provided to LS 160 can include measurements of RSTD, GNSS code phase, GNSS pseudorange, GNSS carrier phase, RTT, Reference Signal Received Power (RSRP), Reference Signal Received Quality (RSRQ), Angle of Arrival (AOA), etc. Location-related measurements may be referred to simply as "location measurements" or "measurements". The techniques described herein enable the UE to obtain movement related measurements (also referred to as "velocity-related measurements" or as "velocity measurements") during a period of time (also referred to as a "window of time") in which other location-related measurements are being obtained by UE 105. UE 105 can then provide LS 160 with both the velocity-related measurements and the other location-related measurements, and LS 160 can then improve the accuracy of the location estimate of UE 105 (and/or an estimated error or level of accuracy thereof) by accounting for the velocity and/or change in velocity of UE 105. It can be noted, however, that techniques provided herein can also be helpful in scenarios in which UE 105 remains stationary.

Figure 2:
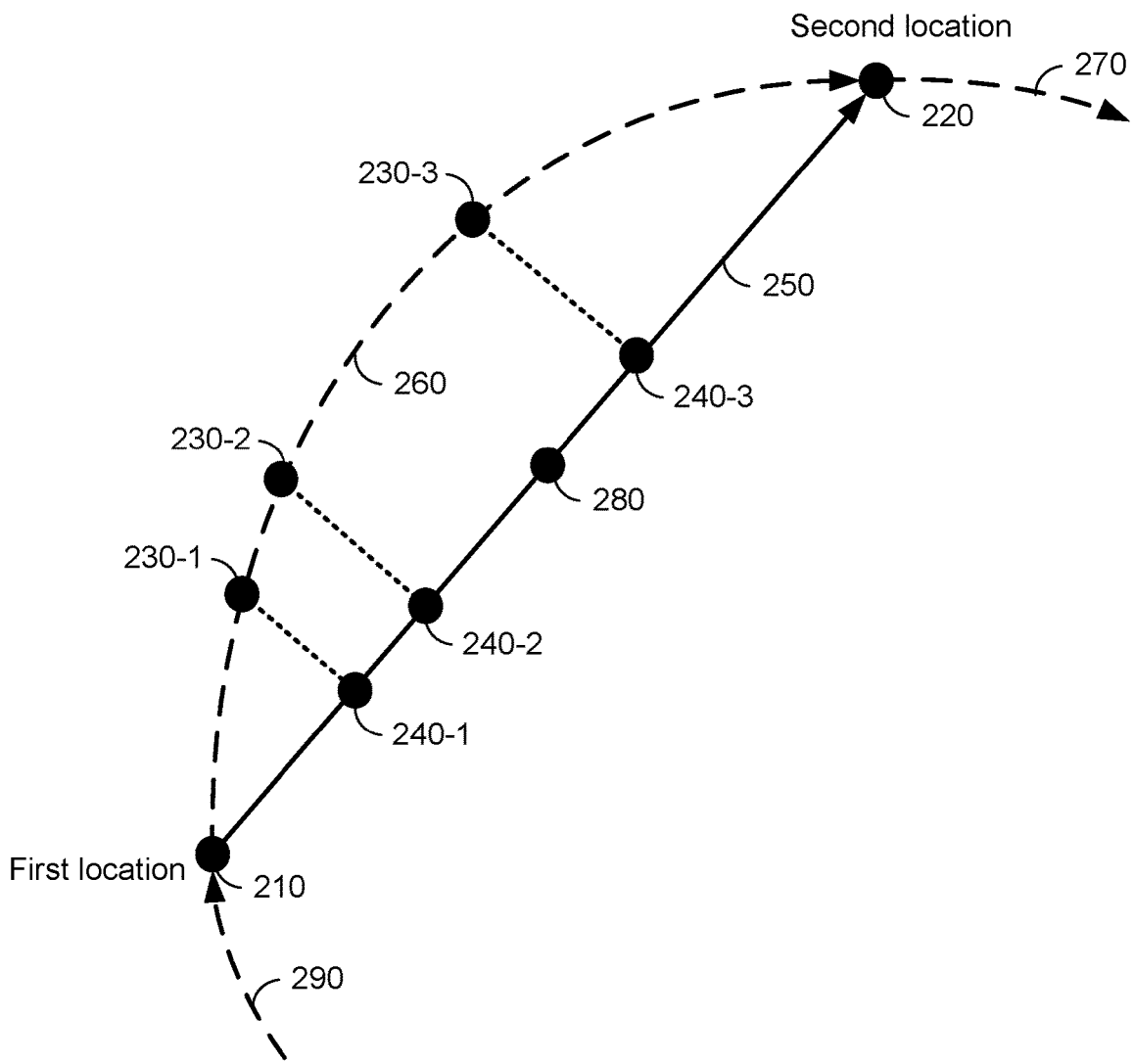
FIG. 2 is a simplified overhead view of an example path traveled by a UE during a period of time in which location measurements are obtained in accordance with techniques disclosed herein.

FIG. 2 is a simplified overhead view of an example path 260 traveled by a UE 105 (not shown) in a horizontal plane during a period of time in which location measurements are obtained, to help illustrate the techniques described herein. Here, UE 105 starts at the first location 210 and travels along a path 260, taking location-related measurements at measurement locations 230-1, 230-2, and 230-3 (collectively referred to herein as "measurement locations 230") along the way, until UE 105 reaches second location 220. Location-related measurements may also occur at the first location 210 and/or second location 220. UE 105 can then send information indicative of the location-related measurements to LS 160 to determine an estimated location of UE 105. In some embodiments, an indication of a time at which each of the location-related measurements was obtained (e.g., a timestamp) can be included by UE 105 in the information indicative of the location-related measurements provided to LS 160.

It can be noted that the path 260 traveled by UE 105 during the period of time in which location-related measurements are obtained may be part of a larger course of travel taken by UE 105. For example, UE 105 may have traveled along an earlier path 290 prior to arriving at the first location 210, and/or may travel along a later path 270 after arriving at the second location 220.

As previously noted, the movement of UE 105 can cause inaccuracies in a location estimate of UE 105 in at least two ways. First, inaccuracies can arise when the location estimate is based on location-related measurements obtained at different measurement locations 230, as shown in FIG. 2. The duration of the period of time in which measurements are obtained can vary, depending on various factors and conditions. The duration may be 15-30 seconds, for example (e.g. for an emergency call), so the distance between the location of an initial measurement (e.g., the first location 210) and the location of a final measurement (e.g., the second location 220) may be substantial (e.g., tens or even hundreds of meters), thereby leading to correspondingly substantial errors in a location estimate based on these measurements.

Second, because UE 105 may continue to move after UE 105 sends the location measurements to LS 160 (e.g., after arriving at the second location 220, as indicated by later path 270) and while LS 160 makes the location determination, there may be a discrepancy between a calculated position for UE 105 based on the location measurements and a position of UE 105 at the time the location determination is made by LS 160. Here, too, the distance between these locations may be tens or even hundreds of meters, leading to an inaccurate location estimate of a current position of UE 105.

According to some embodiments, to help mitigate these and/or other inaccuracies that arise due to movement of UE 105, UE 105 can obtain velocity-related measurements during the period of time the other location measurements are obtained. For example, UE 105 may include one or more inertial sensors (e.g., accelerometers, gyroscopes, compass, and/or other Inertial Measurement Units (IMUs)) as well as other sensors (e.g. barometer) with which movement and/or velocity related information may be obtained. The measured movement (e.g. a horizontal and/or vertical distance moved) and/or velocity and/or information indicative thereof, may then be conveyed from UE 105 to LS 160, enabling LS 160 to account for the movement of UE 105 when determining the estimated location of UE 105. Additionally or alternatively, movement and/or velocity related measurements may be obtained by UE 105 through other means, such as using satellite and/or terrestrial transceiver-based location measurements (e.g. such as a change in an downlink signal frequency observed by UE 105 caused by a Doppler shift).

Depending on desired functionality, information indicative of the movement and/or velocity measurements can be provided by UE 105 to LS 160 in any of a variety of forms. For instance, movement or velocity may be expressed as a straight-line distance traveled by UE 105 for the period of time during which location measurements were obtained together with this period of time. For example, in the case of UE 105 movement according to FIG. 2, UE 105 may provide an indication of the second location 220 relative to the first location 210 (e.g., by providing location coordinates for the two locations 210 and 220 or the straight line distance between locations 210 and 220 along the line 250 and the direction of the line 250), and the period of time (or length of time) during which UE 105 traveled from the first location 210 to the second location 220. It can be noted that this may assume travel by UE 105 along the straight line 250, which may deviate from the path 260 UE 105 actually traveled. However, this may be an acceptable approximation in some instances, because at higher velocities (where location estimates may suffer from larger inaccuracies due to movement) such linear travel is more likely due to physical inertial considerations and design of roads and walking areas (e.g. considering that roads and corridors and hallways in buildings tend to be straight or have only slight curvature except at intersections).

As another example, a movement or velocity of UE 105 may be expressed as a velocity vector, indicating the average velocity (including speed and direction) of UE 105 for the period of time during which location measurements were obtained. Again, information regarding the period or length of time during which UE 105 traveled from the first location 210 to the second location 220 may be conveyed with the velocity vector. An LS 160 receiving this information from UE 105 may determine the length of the overall straight line distance 250 travelled by UE 105 during the period UE 105 was obtaining the location measurements from the product of the period of time with the average velocity.

According to some embodiments, UE 105 may additionally or alternatively provide LS 160 with information indicative of a change in velocity, or acceleration for UE 105. For example, for the example shown in FIG. 2, UE 105 may provide LS 160 with the difference between UE 105 velocity at the first location 210 and UE 105 velocity at the second location 220 and together with the period of time in traveling from the first location 210 to the second location 220. This difference in velocity may be expressed as a velocity with an associated scalar speed component and a direction. The LS 160 may then obtain the average acceleration of UE 105 as the change in velocity divided by the period of time. Because inertial sensors (e.g. accelerometers) may be particularly suited to measure changes in velocity, velocity measurements indicating a change in velocity may be quite accurate. As with velocity, the UE 105 can express the change in velocity in any of a variety of ways, including as a velocity vector.

Figure 3:
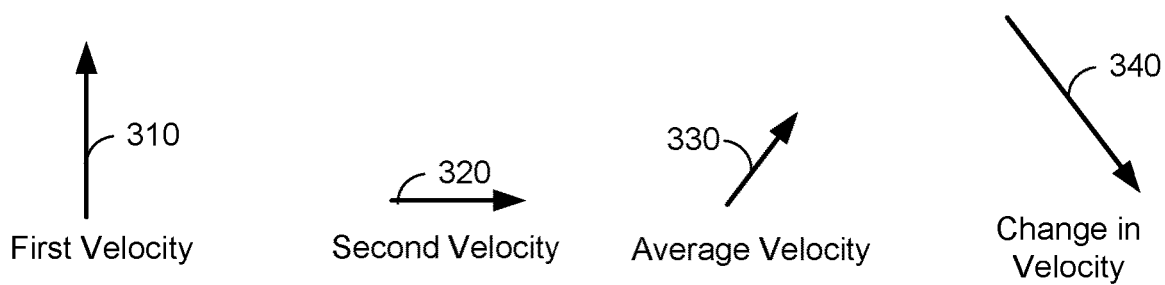
FIG. 3 is an illustration of example velocity vectors indicative of a UE's movement along the path traveled by a UE shown in FIG. 2.

FIG. 3 is an illustration of example velocity vectors indicative of UE 105's movement along path 260 in FIG. 2, which may be based on measurements of velocity and/or acceleration obtained by UE 105 during UE 105's course of travel from the first location 210 to the second location 220. The vector for a first velocity 310 corresponds to the velocity of UE 105 at the first location 210, the vector for a second velocity 320 corresponds to the velocity of UE 105 at the second location 220, and the vector for the average velocity 330 represents the average velocity of UE 105 during UE 105's course of travel from the first location 210 to the second location 220. The average velocity 330 may be obtained in several different ways—e.g. may be obtained as the straight line distance travelled by UE 105 from the first location 210 to the second location 220 divided by the time of travel.

As noted above, a change in velocity 340 may additionally or alternatively be provided to LS 160 by UE 105 and may be provided as a velocity vector. The change in velocity 340 (or mean acceleration or deceleration) may be determined by subtracting the first velocity 310 from the second velocity 320 (e.g. using vector subtraction). The LS 160 may use information indicative of the change in velocity 340 to determine, for example, a relative accuracy of a location fix for UE 105 based on location measurements provided by UE 105. For instance, if the change in velocity is high (e.g. a change in velocity of 20 meters a second or more), then LS 160 may make a determination that the location fix for UE 105 will likely be relatively inaccurate. Such a determination may be possible even when no information regarding the absolute velocity of UE 105 is provided by UE 105 to LS 160 (e.g. if UE 105 is able to provide a change in velocity 340 or mean acceleration or deceleration to LS 160 but not a mean velocity 330 or distance and direction travelled by UE 105).

The LS 160 can use the information indicative of the location measurements and movement or velocity measurements provided by UE 105 to determine an estimated location of UE 105 (and possibly an indication of error or level of accuracy), accounting for a velocity (and/or change in velocity) of UE 105. This can be done in several ways.

In a first technique, LS 160 may extrapolate the location of UE 105 from a previous time to a current (or future) time. To extrapolate the location of UE 105, LS 160 may compensate for the lag time between the time during which the location measurements were obtained by UE 105 and a current time (e.g., a time the estimated location is determined). That is, LS 160 may determine or obtain (e.g. from UE 105) the velocity (and/or acceleration) of UE 105 during the period of time during which the measurements were obtained and estimate an average or current velocity of UE 105 after this period of time. The LS 160 may then use this average or current velocity and the length of the time lag to determine an estimated location of UE 105 at the current time (or at a future time) and/or an expected error or uncertainty for the estimated location. For example, in the example shown in FIG. 2, LS 160 may assume that the location determined for UE 105 based on location measurements obtained by UE 105 for measurement locations 230-1, 230-2 and 230-3 refers to some location along the UE path 260. The LS 160 may approximate the path 260 by the straight line 250 which LS 160 can determine from velocity related information provided by UE 105 as previously described. If LS 160, for example, assumes that the location estimate obtained for UE 105 most probably (or with least error) refers to the mid-point 280 of the straight line 250, LS 160 may extrapolate the location estimate to the second location 220 by adding (or subtracting) X and Y coordinate increments corresponding to the straight line segment from the midpoint 280 to the second location 220. The extrapolated location estimate may now refer to the location of UE 105 at the time when location measurements were completed. To allow for subsequent movement of UE 105 following this time and up to the current time of location determination by LS 160, LS 160 may assume that UE 105 continues to move from the second location 220 with (i) the average velocity 330, (ii) the average velocity 330 combined with the change in velocity 340, or (iii) the second velocity 320. In some embodiments, LS 160 may prefer to use (iii) if provided by UE 105, otherwise (ii) if provided by UE 105 or otherwise (i).

In a second technique, LS 160 may include the relative locations of UE 105 when different measurements were obtained into the determination of the location of UE 105 at some specific time. For example, if the location-related measurements have timestamps to indicate when each measurement was obtained, LS 160 may approximate locations where, along the straight line 250 between the first location 210 and the second location 220, these location-related measurements were obtained. For example, if UE 105 provided timestamps corresponding to the times at which location-related measurements were obtained at measurement locations 230-1, 230-2, and 230-3, LS 160 may be able to use the timestamps to approximate these measurement locations by determining respective locations 240-1, 240-2, and 240-3, along the straight line 250. If provided by UE 105, LS 160 may also take into account a change in velocity for UE 105 to determine the respective locations 240-1, 240-2, and 240-3 with greater accuracy.

As an example, if UE 105 provides LS 160 with the average velocity of UE 105 between the first location 210 and the second location 220 as a velocity vector 330 and provides the period of time elapsing between the first location 210 and second location 220, LS 160 can determine the length of the straight line 250 (as the product of the scalar magnitude of the average velocity and the period of time) and the direction of the straight line 250. The LS 160 can then determine the locations 240-1, 240-2 and 240-3 by assuming UE 105 moves at a constant velocity, equal to the average velocity 330, along the straight line 250 during the period of location measurements. For example, if X and Y are the (unknown) horizontal location coordinates for the first location 210 in some (e.g. local) coordinate system, then the x and y coordinates for a location 240-n (n=1, 2 or 3) may be obtained as:

$$x = X + (VT \cos \alpha) \quad \text{Eq. 1}$$

$$y = Y + (VT \sin \alpha) \quad \text{Eq. 2}$$

where:
V=scalar magnitude of the average velocity 330
α=angle between the direction of the average velocity 330 and the X axis
T=time period between UE 105 obtaining measurements at a location 230-n and UE 105 starting location measurements at the first location 210.

Equations 1 and 2 show that if LS 160 approximates the measurement locations 230-1, 230-2 and 230-3 by the locations 240-1, 240-2 and 240-3 along the straight line 250, the approximate x and y coordinates for each of the locations 230-1, 230-2 and 230-3 can be obtained in terms of the unknown X and Y coordinates for the first location 210 and the known magnitude, direction and duration of the average velocity 330 of UE 105 along the straight line 250 (which is assumed to be constant in equations (1) and (2)). The location measurements provided by UE 105 to LS 160 for each of the measurement locations 230-1, 230-2 and 230-3 will typically provide or enable some equation relating the location coordinates ((x, y) or (x, y, z) when altitude is included) for each measurement location. For example, as is well known, an RSTD measurement for OTDOA for UE 105 may define a 2 dimensional hyperbola (or 3 dimensional hyperboloid) on which the x and y (or x, y and z) coordinates of UE 105 at the time the RSTD is measured are located, which may provide a corresponding equation relating the coordinates. An RTT measurement for UE 105 may similarly define a circle (or sphere) centered at the base station 120 or AP 130 for which the RTT was obtained on which the x and y (or x, y and z) coordinates of UE 105 at the time of measuring the RTT are located, which may provide another equation. A code phase or pseudorange measurement of a GNSS satellite 110 may similarly define a relationship between UE 105 x, y and z coordinates at the time of measurement and the precise time of measurement, which may provide a further equation. Based on the time of each measurement, LS may use equations (1) and (2) to replace the coordinates x and y in each of these equations with the coordinates X and Y for the first location 210 (e.g. and may assume that the z coordinate, if present, in any of these equations does not change and equals the Z coordinate for the first location 210). LS 160 may then solve for the X, Y (and Z) coordinates of the first location 210 using these equations as well possibly as the exact times of measurement at which GNSS code phase or pseudorange measurements are obtained by UE 105.

In other examples, LS 160 could solve for the x, y (and z) coordinates of the second location 220 or for the x, y (and z) coordinates of some other location along the straight line 250 using a technique similar to that just described for the first location 210. If UE 105 provides more detailed information to LS 160 regarding the velocity or movement of UE 105 while obtaining the measurements between the first and second locations 210 and 220 (e.g. such as the exact instantaneous velocity of UE 105 at the first location 210, second location 220 and each of the locations 230-1, 230-2 and 230-3 or the exact relative location for each of these locations), LS 160 may be better able to determine the true path 260 of UE 105 and determine more accurate equations for the x and y coordinates of UE 105 at the measurement locations 230-1, 230-2 and 230-3 than Equations 1 and 2.

In a third technique, LS 160 may calculate an expected error or uncertainty in a location estimate for UE 105 based on movement or velocity information for UE 105. If movement or velocity-related measurements indicate UE 105 is not moving, for example, LS 160 may assume that the location measurements provided by UE 105 are all for the same location and may therefore assign a correspondingly lower expected error or uncertainty for the location estimate for UE 105 determined by LS 160 from the provided location measurements. For example, LS 160 may use any indication of error, quality or statistical uncertainty (e.g. a standard deviation) provided by UE 105 to LS 160 for each location measurement to determine an overall cumulative expected error or uncertainty in a determined location estimate, and may not increase this expected error or uncertainty to compensate for errors that might otherwise have occurred had UE 105 been moving while obtaining location measurements. Alternatively, if movement or velocity-related measurements indicate UE 105 is moving, LS 160 may assume that the location measurements provided by UE 105 were obtained for a number of different locations, as exemplified in FIG. 2, and may assign a higher expected error or uncertainty to either the final determined location estimate for UE 105 or to each location measurement provided to LS 160 by UE 105 that is used by LS 160 to determine the final location estimate. In the latter case, the higher expected error or uncertainty assigned to each location measurement by LS 160 may lead to the determination of a correspondingly higher expected error or uncertainty in the determined location estimate. The higher expected error or uncertainty that is added by LS 160 to the final location estimate or to each location measurement may be related to the distance moved by UE 105 while obtaining location measurements. For example, the added uncertainty or expected error might be set equal to or be based on the straight line distance, or some fraction of the straight line distance (e.g. half the straight line distance), between first location 210 and second location 220 in the example in FIG. 2.

In a fourth technique, which may be similar to the second technique, a UE 105 may provide an LS 160 with timestamps for individual location measurements (e.g. pseudorange measurements for GNSS or time of arrival (TOA) and/or RSTD measurements for OTDOA) and information on UE 105 movement (e.g. trajectory with timestamps). As an example, LS 160 could use the trajectory information to infer the location X (e.g. represented as a 3-tuple comprising x, y and z coordinates) of UE 105 at any time T relative to, and as a known function F of, the location X* (e.g. also a 3-tuple) of UE 105 at the current time T* or at some specific time T* in the past. Thus, LS 160 could determine:

$$X = F(X^*, T-T^*) \quad \text{Eq. 3}$$

For example, if UE 105 moves at a constant velocity V along they axis in the direction of increasing y, then the trajectory information may define F according to the following equations relating the x,y,z coordinates for X to the x*,y*,z* coordinates for X*.

$$x = x^* \quad \text{Eq. 4}$$

$$y = y^* + (T-T^*)V \quad \text{Eq. 5}$$

$$z = z^* \quad \text{Eq. 6}$$

The function F in equation (3) in this example would then embody equations (4) to (6) or some approximation to them as provided by the trajectory information.

In the case of OTDOA, the time T* might refer to the time of measurement of a TOA for the reference cell by UE 105 which could be common to all RSTD measurements. Similarly, for GNSS, the time T* might refer to the time of a particular pseudorange measurement. A measurement (e.g. a TOA for a neighbor cell for OTDOA or a pseudorange for GNSS) for the location X and time T by UE 105 could provide one equation relating the location X coordinates and possibly the time T to known quantities, such as eNB locations and timing differences for OTDOA or satellite vehicle (SV) positions and timing for GNSS, and possibly other fixed but unknown quantities such a UE 105 inter-frequency bias for OTDOA, a UE 105 time bias for GNSS and the location X* and possibly time T*. By replacing each occurrence of X (and T) in such an equation with X* (and T*) using Equation (3), an equation for the location X* (e.g. X* coordinates) could be obtained.

For example, for OTDOA, the TOA (τ) at time T* and location X* for the reference cell 1 (indicated as cell 1 for convenience) may be related to the distance between UE 105 location X* and base station location $(x_1, y_1, z_1)$ according to:

$$\tau_1(T^*) \propto \sqrt{(x^*-x_1)^2+(y^*-y_1)^2+(z^*-z_1)^2} \qquad \text{Eq. 7}$$

Similarly, a TOA measurement for a neighbor cell 2 at location $(x_2, y_2, z_2)$ made at a time T and UE 105 location X would provide:

$$\tau_2(T) \propto \sqrt{(x-x_2)^2+(y-y_2)^2+(z-z_2)^2} \qquad \text{Eq. 8}$$

which results in a RSTD measurement given by:

$$\tau_2(T)-\tau_1(T^*) \propto \sqrt{(x-x_2)^2+(y-y_2)^2+(z-z_2)^2} - \sqrt{(x^*-x_1)^2+(y^*-y_1)^2+(z^*-z_1)^2} \qquad \text{Eq. 9}$$

The UE 105 locations X and X* at times T and T* would be the same in case of a stationary UE 105 and could be solved by using multiple RSTD measurement equations as for traditional use of OTDOA. However, for the moving UE 105, X and X* would be different, but could be transformed to the same location using the trajectory information (e.g. from equation (3)). For the example trajectory of equations (4)-(6), this may result in:

$$\tau_2(T)-\tau_1(T^*) \propto \sqrt{(x^*-x_2)^2+((y^*+(T-T^*)V)-y_2)^2+(z^*-z_2)^2} - \sqrt{(x^*-x_1)^2+(y^*-y_1)^2+(z^*-z_1)^2} \qquad \text{Eq. 10}$$

With multiple RSTD measurements and applying the same type of transformation as in equation (10), a set of equations may be obtained for the location X* at time T*, from which it could be possible to determine the correct UE 105 location X* as if UE 105 had been stationary.

In the case of OTDOA, the TOAs referred to above are measured at different times T and T* but may be treated as being measured at almost the same time in terms of computing the RSTD (from the difference of the TOAs). This may be enabled by measuring TOAs modulo the interval of a radio frame (e.g. modulo the LTE subframe interval of 1 ms in the case of LTE access by UE 105) rather than as an absolute (e.g. Coordinated Universal Time (UTC)) time. However, if the clock source for the TOAs drifts between times T and T*, the RSTD will be incorrect even if UE 105 is stationary. For example, if the clock source drifts by an amount t, the RSTD may contain an error component equal to t. If UE 105 is moving and uses a serving cell or reference cell as the clock source (also referred to as a time source) on a continuous basis (e.g. rather than relying on an internal time source for UE 105 such a crystal oscillator which may be inaccurate) and if the distances between the antenna for this cell and the locations X and X* are D and D*, respectively, then the clock source may appear to UE 105 to drift by an amount (D−D*)/c (where c is the velocity of light) due to the change in signal propagation delay and assuming the clock source is otherwise accurate. This may introduce a "time drift error" (equal to (D−D*)/c) into the RSTD determination that may not be removed by the treatment described above for equations (3) to (10). However, the time drift error could be removed if LS 160 determines the location X* as previously described (e.g. ignoring any time drift error) and then determines each location X (for the other TOA measurements) using equation (3). LS 160 can then calculate the time drift error for each RSTD measurement by assuming the locations X* and X are correct and can then adjust each RSTD measurement (by adding or subtracting the time drift error). The LS 160 can then recompute X* and each location X using the adjusted RSTDs by reapplying the previous technique (e.g. exemplified in equations (3) to (10)). This process may be further iterated to obtain more accurate values for X* and each location X. In order to perform such a calculation, LS 160 would need to know whether UE 105 was using cell timing (e.g. via a frequency lock loop) and which cell was used.

A similar iterative process for OTDOA location of UE 105 is also possible to solve for X* and each location X without resorting to transformations of the location X* as in equation (10), which may be simpler for an implementation. With this process, LS 160 may assume initially that UE 105 is not moving and is located at X* throughout the positioning. LS 160 can then employ traditional OTDOA multilateration techniques to solve for X* and can then compute values for each location X using equation (3). For each location X, LS 160 can calculate a "first OTDOA error" (corresponding to a time drift error) equal to (D−D*)/c related to the apparent timing drift of the cell used as a clock source as just described. LS 160 can also compute a "second OTDOA error" for a TOA for a neighbor cell caused by measuring the TOA at the location X rather than the location X*. The second OTDOA error may equal (D1−D1*)/c, where D1 and D1* are the distances between the neighbor cell antenna and the locations X and X*, respectively. The two OTDOA errors may be independent of one another for a neighbor cell not used as a clock source (since the OTDOA errors may depend on the distances for two different cells) but may be equal and opposite (and may thus cancel) for a neighbor cell used as a clock source (e.g. the serving cell). LS 160 may then adjust the RSTD for each neighbor cell by adding or subtracting the first and second OTDOA errors and may then use the adjusted RSTDs to recompute the location X*. Further iteration could be performed in which the new location X* is used to compute a new location X for each TOA measurement using equation (3) and the new locations are used to compute new first and second OTDOA errors for the original TOA measurements. Convergence of the iteration to a stable value for X* can then be used to stop the iteration.

Figure 5:
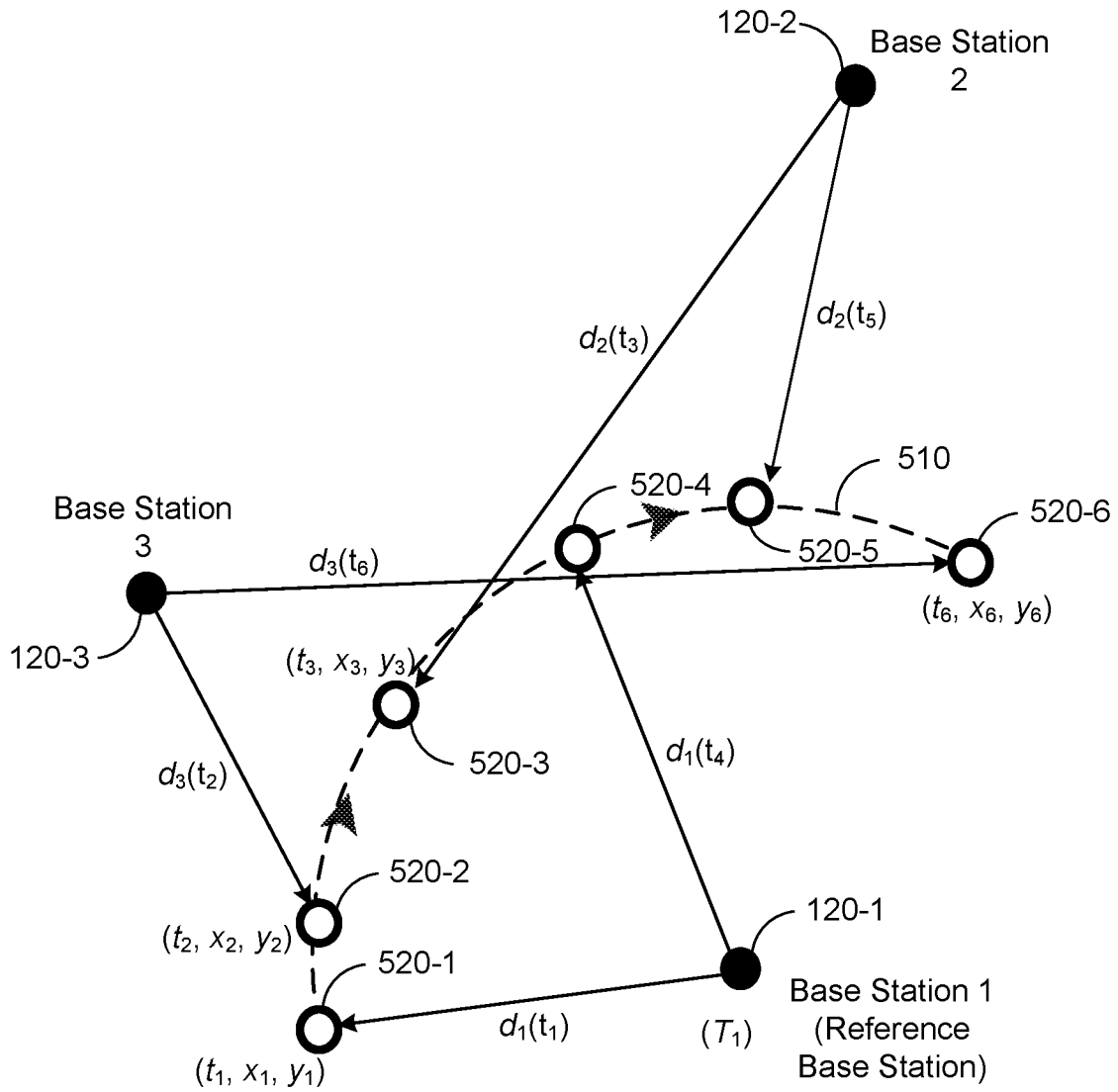
FIG. 5 is a simplified view of an example path traveled by a UE during a period of time in which measurements are obtained from base stations at different times and locations.

More details of a technique for computing a location for UE 105 for OTDOA measurements and using the first OTDOA error and second OTDOA error described above are provided further down in association with FIG. 5.

In some embodiments, LS 160 may use a combination of any two or three or all four of the four previously described techniques to determine a location for UE 105.

Figure 4:
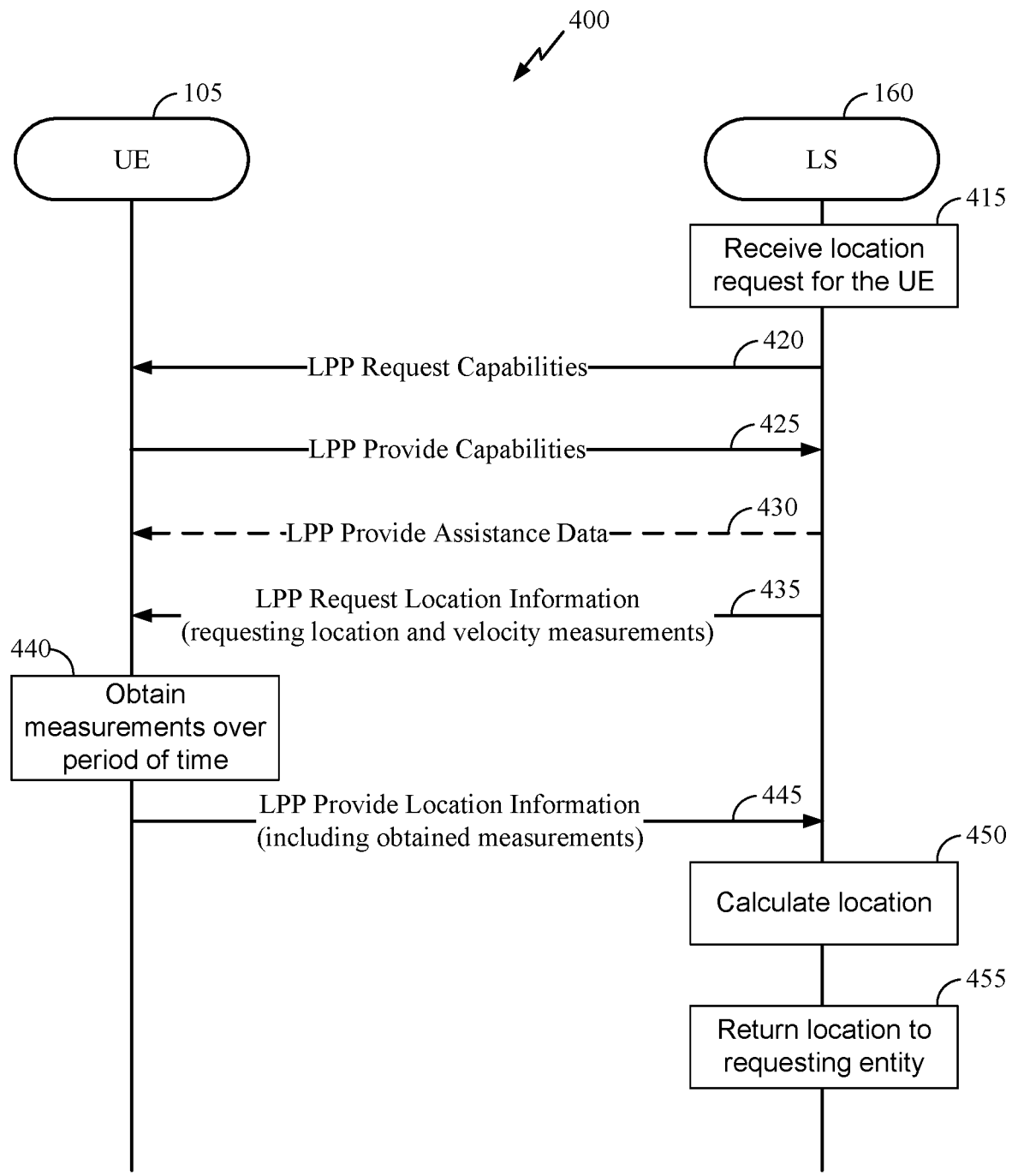
FIG. 4 is a diagram of a signaling flow illustrating communication between a UE and a location server (LS), according to an embodiment.

FIG. 4 is diagram of a signaling flow 400 illustrating communication between UE 105 and LS 160 that can take place in accordance with the techniques provided herein, according to an embodiment. It can be noted that here, messages are provided in accordance with the 3GPP LPP protocol as an example. However, embodiments are not so limited. For example, a combination of LPP and LPPe, referred to as LPP/LPPe, might be used in another embodiment where base stations 120 provide UE 105 with LTE wireless access to network 170. In a further embodiment, an NR positioning protocol (NPP or NRPP) might be used where base stations 120 provide UE 105 with NR wireless access to network 170.

At block 415, signaling flow 400 may be initiated when LS 160 receives a location request for UE 105. The location request may come from any of a variety of entities, including LS 160 itself, depending on the situation. For example, an external client 180 (e.g., as illustrated in FIG. 1) may send a request for the location of UE 105 to LS 160. Additionally or alternatively, the location request may come from UE 105 or an entity in network 170 such as a Mobility Management Entity (MME), a Gateway Mobile Location Center (GMLC), an Access and Mobility Management Function (AMF) or a Location Retrieval Function (LRF). This request may be triggered, for example, by an application executed by UE 105 or by an external client 180.

At action 420, LS 160 may send an LPP Request Capabilities message to UE 105 to request the positioning capabilities of UE 105. The UE 105 can respond in accordance with the LPP protocol by providing various location-related capabilities of UE 105, such as capabilities to support different position methods such as Assisted GNSS (A-GNSS), OTDOA, Enhanced Cell ID (ECID), WLAN, and sensors and may further indicate the location measurements and/or assistance data which can be supported by UE 105 for each supported position method. According to some embodiments, movement and velocity-related capabilities may also be provided. These capabilities may indicate, for example, whether UE 105 is capable of obtaining and providing velocity-related measurements and an indication of which types of velocity-related measurements UE 105 is able to provide, and so forth. For example, UE 105 could indicate a capability to provide an average velocity (e.g. the average velocity 330 in the example in FIGS. 2 and 3), a change in velocity (e.g. the change in velocity 340 in the example in FIGS. 2 and 3) and a period of time for the average velocity and change in velocity. UE 105 may also or instead indicate its capability to provide a timestamp, an instantaneous velocity, an instantaneous acceleration and/or a relative location for each location (or each small interval of time) at which a location measurement is obtained. These capabilities are provided by UE 105 at action 425 in the LPP Provide Capabilities message sent by UE 105 to LS 160.

At action 430, LS 160 may send UE 105 an LPP Provide Assistance Data message, in response to receiving the LPP Provide Capabilities message at action 425. Here, the LPP Provide Assistance Data message may provide assistance data to UE 105, where the assistance data is able to support one or more position methods supported by both UE 105 and LS 160 and is commensurate with the capabilities of UE 105, as indicated in the LPP Provide Capabilities message. For example, if UE 105 indicates that it is capable of obtaining location-related measurements for OTDOA from signal measurements for base stations 120, LS 160 may provide a list of cells supported by nearby base stations 120 (e.g. determined based on a current serving cell or base station 120 for UE 105) and information (e.g. timing, frequency, bandwidth, code sequence, muting) for signals transmitted in these cells such as a positioning reference signal (PRS) or a Cell-specific Reference Signal (CRS) used for RSTD measurements. Similarly, if UE 105 indicates support of A-GNSS in the LPP Provide Capabilities message sent at action 425, LS 160 may include information for visible GNSS satellites 110 in the LPP Provide Assistance Data message sent at action 430 (e.g. such as almanac data, ephemeris data, SV IDs and acquisition assistance data). Action 430 may be optional and may not occur in some implementations.

At action 435, LS 160 sends an LPP Request Location Information message to UE 105 to request location measurements from UE 105 for one or more position methods supported by UE 105, as indicated at action 425. Here, LS 160 may request both location-related measurements (e.g. measurements for A-GNSS, OTDOA and/or ECID) and movement or velocity-related measurements. In some embodiments, the request for movement or velocity-related measurements may be based on an indication in the LPP Provide Capabilities message sent by UE 105 at action 425 that UE 105 is capable of providing movement or velocity-related measurements. For example, in one embodiment, LS 160 may request UE 105 to provide an average velocity for UE 105 during the period of location measurements, a change in velocity during the period of location measurements and the period of time for the location measurements. In another embodiment, LS 160 may request UE 105 to provide one or more of a timestamp, an instantaneous velocity, an instantaneous acceleration or a relative location for each location (or each small interval of time) at which a requested location measurement is obtained by UE 105. In some embodiments, the LPP Request Location Information message may also include a requested accuracy for any location measurements or location estimate and/or a maximum response time.

Following action 435, in some embodiments (not shown in FIG. 4), UE 105 may request assistance data from LS 160 to help enable the location-related measurements requested at action 435 (e.g. by sending an LPP Request Assistance Data message to LS 160). LS may then return some or all of the requested assistance data to UE 105 (e.g. by sending an LPP Provide Assistance Data message to UE 105).

At block 440, UE 105 obtains the measurements requested at action 435 (e.g. both the location-related measurements and the movement or velocity-related measurements) over a period of time. As previously indicated, the length of this period of time may vary, depending on various factors such as environmental factors, a desired minimum number of measurements, a requested accuracy and/or a requested maximum response time. The location-related measurements obtained by UE 105 may be obtained for Radio Frequency (RF) signals transmitted by base stations 120, APs 130 and/or GNSS satellites 110. For example, the location-related measurements may include measurements of RSTD obtained by measuring PRS or other reference signals (e.g. CRS signals) transmitted by base stations 120, measurements of RTT obtained by measuring signals transmitted from and/or to base stations 120 and/or APs 130, and/or measurements of pseudorange or code phase obtained by measuring a navigation signal transmitted by one or more GNSS satellites 110.

The movement or velocity-related measurements may be obtained by UE 105 at block 440 using inertial sensors within, attached to or accessible from UE 105 and may include the measurements previously described such as an average velocity, a change in velocity, a period of time for the location measurements and/or, for each location-related measurement (and/or at other times when no location-related measurements are obtained), an instantaneous velocity, an instantaneous acceleration and/or a relative location. In some embodiments, UE 105 may obtain a timestamp indicating an absolute time or relative time for each of the location-related measurements (and/or each of the movement or velocity-related measurements) and/or may determine an uncertainty or expected error associated with each location-related measurement. The UE 105 may ignore motion of UE 105 (e.g. may assume that UE 105 is stationary during the period of time for obtaining location measurements) when obtaining any expected error or uncertainty for a location-related measurement. Therefore, UE 105 may not add any additional expected error or uncertainty to any of the location-related measurements to allow for possible movement or velocity of UE 105 while obtaining the location-related measurements. Instead, UE 105 may allow LS 160 to determine any contribution of UE 105 movement or velocity to an expected error or uncertainty in a location-related measurement or final determined location estimate as described previously.

At action 445, information indicative of one or more location-related measurements and one or more movement or velocity-related measurements is sent to LS 160 by UE 105 in an LPP Provide Location Information message. In one embodiment, movement or velocity related measurements may include one or more of an average velocity for UE 105 during the period of location measurements, a change in velocity for UE 105 during the period of location measurements, the period of time for the location measurements, and/or, for each location-related measurement, a timestamp, an instantaneous velocity, an instantaneous acceleration and/or a relative location.

At block 450, LS 160 can use the measurement information received at action 445 (indicative of one or more location-related measurements and one or more movement or velocity-related measurements) to calculate an estimated location of UE 105. As indicated above, the location estimate can account for a movement, a velocity and/or change in velocity of UE 105 for the period of time during which location-related measurements were obtained at block 440, based on the one or more movement or velocity-related measurements. For example, the location estimate may be obtained with higher accuracy by LS 160 as described previously. In some embodiments, an uncertainty or expected error in the calculated location estimate may also be determined by LS 160 at block 450, based on the one or more movement or velocity-related measurements received at action 445. According to some embodiments, the information indicative of the one or more location-related measurements may be based on determining by LS 160 that UE 105 is stationary or almost stationary during the period of time based on the movement or velocity-related measurements. The calculated location estimate (and any accompanying uncertainty or expected error, if determined) may then be returned to the requesting entity at block 455.

In a variant of signaling flow 400 (not shown in FIG. 4), following block 440, UE 105 may calculate an estimated location of UE 105 based on the location-related measurements and movement or velocity-related measurements obtained by UE 105 at block 440. For example, the location calculation by UE 105 may be assisted by assistance data received by UE 105 from LS 160 such as the assistance data received at action 430. The assistance data may include, for example, the antenna locations and transmission timing for base stations 120 and/or APs 130 measured by UE at block 440 and/or orbital data and other data for any GNSS satellites 110 measured by UE at block 440. The location calculation by UE 105 may be similar to or the same as that described for LS 160 at block 450 and may be similarly based on the techniques described previously with respect to FIGS. 1-3 and as described further down with respect to FIGS. 5-6. With this variant of signaling flow 400, UE 105 may send the estimated location for UE 105 calculated by UE 105 to LS 160 at action 445 and block 450 may not occur.

FIG. 5 is a simplified overhead view (similar to FIG. 2) of an example path 510 (also referred to as a trajectory) traveled by a UE 105 (not shown) during a period of time in which six TOA measurements at locations 520-1, 520-2, 520-3, 520-4, 520-5, and 520-6; (collectively and generically referred to herein as locations 520) are obtained by UE 105 from signals transmitted by three base stations (120-1, 120-2, and 120-3; (collectively and generically referred to herein as base stations 120). FIG. 5 and the description below is provided to help illustrate how, due to the UE 105's velocity and path of travel, TOA measurements of different base stations 120 may be received at different locations and different times, which can be compensated for during location determination (e.g. by LS 160). In the description below, the number of TOA measurements is assumed to be N (where N≥2) and hence FIG. 5 provides an illustration for the case where N=6 or for the first 6 TOA measurements when N>6. In FIG. 5, base stations 120 are represented by small circles with a black interior and the locations 520 are represented by small circles with a white interior. The evaluation below is also based on assuming that base stations 120 provide LTE access to UE 105 and that UE 105 measures PRS or CRS signals transmitted by base stations 120 in one or more 1 millisecond (ms) subframes for LTE (e.g. as defined in 3GPP TS 36.211) according to the OTDOA position method defined for LTE in 3GPP TS 36.355. However, a similar or identical evaluation would be possible based on assuming that base stations 120 provide other types of wireless access to UE 105 such as NR or Wi-Fi and where UE 105 may measure other signals transmitted by base stations 120.

The TOA values measured by UE 105 for each base station 120 may be related to the geometric distance between the UE 105 and the respective base station 120. The NTOA values measured at the UE 105 may be written as:

$$\hat{\tau}_1(t_1) = T_1(t_1) + \frac{d_1(t_1)}{c} + \delta_1(t_1) + \varepsilon_1 \qquad \text{Eq. 11a}$$

$$\hat{\tau}_2(t_2) = T_2(t_2) + \frac{d_2(t_2)}{c} + \delta_2(t_2) + \varepsilon_2 \qquad \text{Eq. 11b}$$

$$\vdots$$

$$\hat{\tau}_N(t_N) = T_N(t_N) + \frac{d_N(t_N)}{c} + \delta_N(t_N) + \varepsilon_N \qquad \text{Eq. 11c}$$

where $\hat{\tau}_i(t_i)$ is the TOA (mod 1 ms) measured at UE 105 for base station 120-$i$ at receiver time $t_i$;

$T_i(t_i)$ is the absolute transmit time (mod 1 ms) at which base station 120-$i$ transmits a downlink subframe i received by UE 105 at receiver time $t_i$;

$d_i(t_i)$ is the distance between UE 105 and base station 120-$i$ at receiver time $t_i$;

c is the speed of the radio waves (speed of light);

$\varepsilon_i$ is the measurement error due to noise, interference, etc.

$\delta_i(t_i)$ is the difference (mod 1 ms) between UE 105 time and receiver time $t_i$ (e.g. equals UE 105 time at $t_i$ minus $t_i$)

It is noted that the receiver time $t_i$ for TOA i may refer to the absolute time (e.g. Global Positioning System (GPS) time or UTC time) corresponding to the TOA $\hat{\tau}_i(t_i)$ measured by UE 105 (e.g. which may equal the absolute time at which the signal measured by UE 105 arrives at UE 105). It is also noted that all times and arithmetic operations on time, with the exception of the receiver times $t_i$ and operations on receiver time, may be modulo the subframe interval of 1 ms, which may allow measurements made at different receiver times to be combined without compensation for different integer ms components of time.

If the N TOA measurements are made at the same receiver time, then $t_1=t_i=t_N=t$. However, usually not all TOA measurements can be made at the same time due to different muting pattern and receiver measurement capacity constraints. If UE 105 is stationary during the N TOA measurements and neglecting any UE 105 receiver clock drifts (i.e. assuming $\delta_i$ is constant), the individual measurement times $t_i$ may have no impact on the position calculation. However, if UE 105 is moving during the N TOA measurements, as illustrated in FIG. 5, the calculated UE 105 position (e.g., at action 450 of FIG. 4) will be in error if there is no compensation for the UE 105 movement.

In OTDOA location, the TOA measured from a reference base station (which is assumed to be base station 120-1 in this example) is subtracted from each of the TOAs measured from neighbor base stations (e.g. base stations 120-2, 120-3). These TOA differences are defined as OTDOA, or Reference Signal Time Difference (RSTD), since the TOAs are measured from reference signals.

Defining the TOA measurement from the reference base station 120-1 as $\hat{\tau}_1$, the OTDOAs (or RSTDs) are then given by:

$$OTDOA_{2,1}(\Delta t_{2,1}) = \hat{\tau}_2(t_2) - \hat{\tau}_1(t_1) = \qquad \text{Eq. 12a}$$
$$RTD_{2,1} + \frac{d_2(t_2) - d_1(t_1)}{c} + (\delta_2(t_2) - \delta_1(t_1)) + (\varepsilon_2 - \varepsilon_1)$$

$$OTDOA_{3,1}(\Delta t_{3,1}) = \hat{\tau}_3(t_3) - \hat{\tau}_1(t_1) = \qquad \text{Eq. 12b}$$
$$RTD_{3,1} + \frac{d_3(t_3) - d_1(t_1)}{c} + (\delta_3(t_3) - \delta_1(t_1)) + (\varepsilon_3 - \varepsilon_1)$$

$$\vdots$$

$$OTDOA_{N,1}(\Delta t_{N,1}) = \hat{\tau}_N(t_N) - \hat{\tau}_1(t_1) = \qquad \text{Eq. 12c}$$
$$RTD_{N,1} + \frac{d_N(t_N) - d_1(t_1)}{c} + (\delta_N(t_N) - \delta_1(t_1)) + (\varepsilon_N - \varepsilon_1)$$

Here, $RTD_{i,1} = T_i - T_1$ are the time differences (mod 1 ms) of the base station 120 transmissions (aka, Real Time Difference (RTD)).

If UE 105 time is locked (e.g. synchronized) to the time from the serving or reference cell (e.g., reference base station 120-1), the UE 105 time differences $\delta_i(t_i)$ may change with UE 105 location due to an apparent change in serving or reference cell timing observed by UE 105 at different locations 120-$i$. For example, the serving or reference cell time observed by UE 105 may equal the actual cell time as transmitted from the cell antenna (e.g. for base station 120-1) less the propagation time from the cell antenna to UE 105 (less any internal RF chain delay in UE 105). For example, this may mean that $\delta_i(t_i)$ equals $-d_1(t_i)$ when UE 105 is synchronized to reference base station 120-1 and when transmission from reference base station 120-1 is synchronized to absolute (e.g. GPS or UTC) time. Note that this may require UE 105 to update the time for UE 105 on a continuous basis (e.g. using a time and frequency tracking loop) based on the time observed for the serving or reference cell and not periodically. Therefore, if UE 105 moves closer to the cell antenna by a distance d, UE time may speed up by (e.g. gain) an amount d/c, whereas if UE 105 moves further away by a distance d, UE 105 time may slow down by (e.g. lose) an amount d/c. Assuming UE 105 time is locked (or synchronized) to the apparent time observed by UE 105 from the reference base station 120-1, and assuming any drift in reference base station 120-1 time is part of the error terms $\varepsilon_i$, the equations (12) yield the following:

$$OTDOA_{2,1}(\Delta t_{2,1}) = \qquad \text{Eq. 13a}$$
$$RTD_{2,1} + \frac{d_2(t_2) - d_1(t_1)}{c} + \frac{d_1(t_1) - d_1(t_2)}{c} + (\varepsilon_2 - \varepsilon_1)$$

$$OTDOA_{3,1}(\Delta t_{3,1}) = \qquad \text{Eq. 13b}$$
$$RTD_{3,1} + \frac{d_3(t_3) - d_1(t_1)}{c} + \frac{d_1(t_1) - d_1(t_3)}{c} + (\varepsilon_3 - \varepsilon_1)$$

$$\vdots$$

$$OTDOA_{N,1}(\Delta t_{N,1}) = \qquad \text{Eq. 13c}$$
$$RTD_{N,1} + \frac{d_N(t_N) - d_1(t_1)}{c} + \frac{d_1(t_1) - d_1(t_N)}{c} + (\varepsilon_N - \varepsilon_1)$$

Which gives:

$$OTDOA_{2,1}(\Delta t_{2,1}) = RTD_{2,1} + \frac{d_2(t_2) - d_1(t_2)}{c} + (\varepsilon_2 - \varepsilon_1) \qquad \text{Eq. 14a}$$

$$OTDOA_{3,1}(\Delta t_{3,1}) = RTD_{3,1} + \frac{d_3(t_3) - d_1(t_3)}{c} + (\varepsilon_3 - \varepsilon_1) \qquad \text{Eq. 14b}$$

$$\vdots$$

$$OTDOA_{N,1}(\Delta t_{N,1}) = RTD_{N,1} + \frac{d_N(t_N) - d_1(t_N)}{c} + (\varepsilon_N - \varepsilon_1) \qquad \text{Eq. 14c}$$

Equations (13) and (14) may include the contribution of both the first OTDOA error (also referred to as the time drift error) and second OTDOA error referred to herein previously. If UE 105 time is not locked to the serving or reference cell timing (e.g. if UE 105 time is based on a local UE 105 clock such as a crystal oscillator or is locked to another external time source such as GNSS for which UE 105 movement related changes can be removed by UE 105), the $\delta_i(t_i)$ terms in equations (12) may be approximately constant with any drift in UE 105 time being part of the measurement errors $\varepsilon_i$. In this case, equations (12) can be written as:

$$OTDOA_{2,1}(\Delta t_{2,1}) = RTD_{2,1} + \frac{d_2(t_2) - d_1(t_1)}{c} + (\varepsilon_2 - \varepsilon_1) \qquad \text{Eq. 15a}$$

$$OTDOA_{3,1}(\Delta t_{3,1}) = RTD_{3,1} + \frac{d_3(t_3) - d_1(t_1)}{c} + (\varepsilon_3 - \varepsilon_1) \qquad \text{Eq. 15b}$$

$$\vdots$$

$$OTDOA_{N,1}(\Delta t_{N,1}) = RTD_{N,1} + \frac{d_N(t_N) - d_1(t_1)}{c} + (\varepsilon_N - \varepsilon_1) \qquad \text{Eq. 15c}$$

In equations (15), the first OTDOA error referred to previously may not be present and only the second OTDOA error may need to be removed. To obtain the location of UE 105, the location server 160 will need to know which set of equations to solve (e.g. equations (14) or (15)), and will thus need to know whether UE 105 time is locked (or synchronized) to the reference base station 120-1 time or is free-running.

For the next part of the evaluation exemplified by FIG. 5, equations (15) are assumed to show how a location server 160 (or the UE 105) may obtain the location of UE 105. Without loss of generality, a two dimensional Cartesian coordinate system in the x-y plane is adopted, and the UE 105 location coordinates are denoted as (x,y) and the base station 120-$k$ coordinates are denoted as $(x_k, y_k)$. The distances $d_k$ can then be written as:

$$d_k(t_i) = \sqrt{(x(t_i) - x_k)^2 + (y(t_i) - y_k)^2} \qquad \text{Eq. 16}$$

and equations (15) can be expanded into (assuming $RTD_{i,1}=0$, i.e., synchronized network):

$$OTDOA_{2,1}(\Delta t_{2,1}) = \frac{\sqrt{(x(t_2)-x_2)^2+(y(t_2)-y_2)^2}-\sqrt{(x(t_1)-x_1)^2+(y(t_1)-y_1)^2}}{c}+(\varepsilon_2-\varepsilon_1) \quad \text{Eq. 17a}$$

$$OTDOA_{3,1}(\Delta t_{3,1}) = \frac{\sqrt{(x(t_3)-x_3)^2+(y(t_3)-y_3)^2}-\sqrt{(x(t_1)-x_1)^2+(y(t_1)-y_1)^2}}{c}+(\varepsilon_3-\varepsilon_1) \quad \text{Eq. 17b}$$

$$\vdots$$

$$OTDOA_{N,1}(\Delta t_{N,1}) = \frac{\sqrt{(x(t_N)-x_N)^2+(y(t_N)-y_N)^2}-\sqrt{(x(t_1)-x_1)^2+(y(t_1)-y_1)^2}}{c}+(\varepsilon_N-\varepsilon_1) \quad \text{Eq. 17c}$$

In case of a moving UE 105, as shown in FIG. 5, the unknown UE 105 location (x,y) in equation (17) is measurement time $t_i$ dependent. I.e., there are as many unknowns as available equations.

The UE 105 location at a time $t_1$ (when the TOA measurement for the reference base station 120-1 is obtained in this example) and a time $t_i$ are related to each other by the trajectory 510 for UE 105. The UE 105 trajectory 510 could be modelled (or approximated) using basic kinematic equations; for example:

$$s = v \cdot t + \tfrac{1}{2} a \cdot t^2 \quad \text{Eq. 18}$$

where s is the displacement of UE 105, t is the time for which UE 105 moved, v is the initial UE 105 velocity, and a is the UE 105 acceleration. In this case, the UE 105 coordinates at different measurement times can be related as follows:

$$x(t_i) = x(t_1) + v_{x,t_i}(t_i - t_1) + \tfrac{1}{2} a_{x,t_i}(t_i - t_1)^2 \quad \text{Eq. 19a}$$

$$y(t_i) = y(t_1) + v_{y,t_i}(t_i - t_1) + \tfrac{1}{2} a_{y,t_i}(t_i - t_1)^2 \quad \text{Eq. 19b}$$

where $v_{x,t_i}$, $v_{y,t_i}$ are the (x,y) components of the UE 105 velocity at receiver time $t_i$, and $a_{x,t_i}$, $a_{y,t_i}$ are the (x,y) components of the UE 105 acceleration at receiver time t1. It is noted that equations (19) are only exact for a constant UE 105 velocity and acceleration and are otherwise an approximation. Equations (19) also provide another example of equation (3) described previously.

The OTDOA equation (17) can be written as (with $n_{i,1}=(\varepsilon_i-\varepsilon_1)$):

$$OTDOA_{2,1}(\Delta t_{2,1}) = \frac{\sqrt{\left(x(t_1)+v_{x,t_2}(t_2-t_1)+\tfrac{1}{2}a_{x,t_2}(t_2-t_1)^2-x_2\right)^2+\left(y(t_1)+v_{y,t_2}(t_2-t_1)+\tfrac{1}{2}a_{y,t_2}(t_2-t_1)^2-y_2\right)^2}-\sqrt{(x(t_1)-x_1)^2+(y(t_1)-y_1)^2}}{c}+\eta_{2,1} \quad \text{Eq. 20a}$$

$$OTDOA_{3,1}(\Delta t_{3,1}) = \frac{\sqrt{\left(x(t_1)+v_{x,t_3}(t_3-t_1)+\tfrac{1}{2}a_{x,t_3}(t_3-t_1)^2-x_3\right)^2+\left(y(t_1)+v_{y,t_3}(t_3-t_1)+\tfrac{1}{2}a_{y,t_3}(t_3-t_1)^2-y_3\right)^2}-\sqrt{(x(t_1)-x_1)^2+(y(t_1)-y_1)^2}}{c}+\eta_{i,1} \quad \text{Eq. 20b}$$

$$\vdots$$

$$OTDOA_{N,1}(\Delta t_{N,1}) = \frac{\sqrt{\left(x(t_1)+v_{x,t_N}(t_N-t_1)+\tfrac{1}{2}a_{x,t_N}(t_N-t_1)^2-x_N\right)^2+\left(y(t_1)+v_{y,t_N}(t_N-t_1)+\tfrac{1}{2}a_{y,t_N}(t_N-t_1)^2-y_N\right)^2}-\sqrt{(x(t_1)-x_1)^2+(y(t_1)-y_1)^2}}{c}+\eta_{N,1} \quad \text{Eq. 20c}$$

In equations (19) and (20), the UE 105 trajectory 510 is approximated as a linear track starting at the UE 105 location at time $t_1$ to the measurement time location at time $t_i$. This approximation may get worse the further the measurement time $t_i$ is away from the reference base station 120-1 measurement time $t_1$. A more accurate model of the UE 105 path 510 may be to consider the sum of all previous $(t_i-t_{i-1})$ segments:

$$x(t_k) = x(t_1) + \sum_{i=2}^{k}\left[v_{x,t_i} \cdot (t_i - t_{i-1}) + \frac{1}{2}a_{x,t_i} \cdot (t_i - t_{i-1})^2\right], \quad \text{Eq. 21a}$$

$$k = 2 \ldots N$$

$$y(t_k) = y(t_1) + \sum_{i=2}^{k}\left[v_{y,t_i} \cdot (t_i - t_{i-1}) + \frac{1}{2}a_{y,t_i} \cdot (t_i - t_{i-1})^2\right], \quad \text{Eq. 21b}$$

$$k = 2 \ldots N$$

which may result in OTDOA equations as follows:

$$OTDOA_{2,1}(\Delta t_{2,1}) = \frac{\sqrt{(x(t_1)-x_2+V_{x,2})^2+(y(t_1)-y_2+V_{y,2})^2}-\sqrt{(x(t_1)-x_1)^2+(y(t_1)-y_1)^2}}{c}+\eta_{2,1} \quad \text{Eq. 22a}$$

-continued $$OTDOA_{3,1}(\Delta t_{3,1}) = \frac{\sqrt{(x(t_1) - x_3 + V_{x,3})^2 + (y(t_1) - y_3 + V_{y,3})^2} - \sqrt{(x(t_1) - x_1)^2 + (y(t_1) - y_1)^2}}{c} + \eta_{i,1} \quad \text{Eq. 22b}$$

$$\vdots$$

$$OTDOA_{N,1}(\Delta t_{N,1}) = \frac{\sqrt{(x(t_1) - x_N + V_{x,N})^2 + (y(t_1) - y_N + V_{y,N})^2} - \sqrt{(x(t_1) - x_1)^2 + (y(t_1) - y_1)^2}}{c} + \eta_{N,1} \quad \text{Eq. 22c}$$

with $$V_{v,k} = \sum_{i=2}^{k}\left[v_{x,t_i} \cdot (t_i - t_{i-1}) + \frac{1}{2} a_{x,t_i} \cdot (t_i - t_{i-1})^2\right] \quad \text{Eq. 23a}$$

$$V_{y,k} = \sum_{i=2}^{k}\left[v_{y,t_i} \cdot (t_i - t_{i-1}) + \frac{1}{2} a_{y,t_i} \cdot (t_i - t_{i-1})^2\right] \quad \text{Eq. 23b}$$

In equations (22) the unknown UE 105 location (x,y) is for a single time $t_1$ where the reference base station 120-1 TOA measurement was made (in this example; any desired time $t_i$ could be selected). Therefore, equations (22) can now be solved for the UE 105 location at time $t_1$. If UE 105 is stationary, then $(v_x,v_y)$ and $(a_x,a_y)$ would be zero, and equations (22) define traditional OTDOA equations.

Equations (22) may be solved using known techniques, if the following UE 105 measurement quantities are known (e.g. are provided by UE 105 to LS 160 where the location computation described here is performed or when the location computation is performed by UE 105):

$OTDOA_{i,1}$: This is the UE 105 RSTD measurement, defined as a difference of TOAs between a neighbor base station 120-i and the reference base station 102-1.

$t_i$, $t_1$: This is the time when UE 105 made the TOA measurement for the neighbor base station 120-i, and reference base station 120-1.

$v_{x,t_i}$, $v_{y,t_i}$: This is the UE 105 instantaneous velocity in the x and y directions at measurement time $t_i$ when UE 105 made the TOA measurement for the neighbor base station 120-i.

$a_{x,t_i}$, $a_{y,t_i}$: This is the UE 105 instantaneous acceleration in the x and y directions at measurement time $t_i$ when UE 105 made the TOA measurement for the neighbor base station 120-i.

In one example technique, equations (22) may be solved by first rewriting compactly using matrix notation as follows:

$$r(\Delta t_{i,1}) = f(x(t_1)) + n \quad \text{Eq. 24}$$

where:

$r(\Delta t_{i,1})$ is a N-1 dimensional column vector of OTDOA measurements f is a N-1 dimensional column vector containing the range differences:

$$f_i(x(t_1), y(t_1)) = \frac{\sqrt{(x(t_1) - x_i + V_{x,i})^2 + (y(t_1) - y_i + V_{y,i})^2} - \sqrt{(x(t_1) - x_1)^2 + (y(t_1) - y_1)^2}}{c} \quad \text{Eq. 25}$$

$x(t_1)$ is the (unknown) mobile location $[x,y]^T$ at time $t_1$.

n is a N-1 dimensional column vector containing the OTDOA measurement error.

If $x(t_1)$ is regarded as an unknown but non-random vector and n is assumed to have zero-mean and a Gaussian distribution, then the conditional probability density function of r given $x(t_1)$ may be given by:

$$p(r \mid x(t_1)) = \frac{1}{(2\pi)^{(N-1)/2}|N|^{1/2}} \exp\{-(1/2)[r - f(x(t_1))]^T N^{-1}[r - f(x(t_1))]\} \quad \text{Eq. 26}$$

In equation (26), N is the covariance matrix of the measurement error:

$$N = E\{(n - E\{n\})(n - E\{n\})^T\} \quad \text{Eq. 27}$$

The maximum likelihood estimator is therefore the value $x(t_1)$ which minimizes the following cost function:

$$Q(x(t_1)) = [r - f(x(t_1))]^T N^{-1}[r - f(x(t_1))] \quad \text{Eq. 28}$$

Therefore $$\hat{x}(t_1) = \operatorname{argmin}\{[r - f(x(t_1))]^T N^{-1}[r - f(x(t_1))]\} \quad \text{Eq. 29}$$

The minimization of Q is a reasonable criterion even when the additive error cannot be assumed to be Gaussian. In this case, the resulting estimator is called the least-squares estimator and $N^{-1}$ is regarded as the matrix of weighting coefficients.

The function $f(x(t_1))$ in equation (24) is a non-linear vector function. A common approach to minimize the cost function in equation (28) is to linearize $f(x(t_1))$. $f(x(t_1))$ can be expanded in a Taylor series about a reference point $x_0$ and the second and higher terms can be neglected.

The function $f(x(t_1))$ can be represented as:

$$f(x(t_1)) \simeq f(x_0) + G \cdot (x(t_1) - x_0) \quad \text{Eq. 30}$$

where $$G = \begin{bmatrix} \frac{\partial f_2}{\partial x(t_1)}\bigg|_{x=x_0} & \frac{\partial f_2}{\partial y(t_1)}\bigg|_{x=x_0} \\ \frac{\partial f_3}{\partial x(t_1)}\bigg|_{x=x_0} & \frac{\partial f_3}{\partial y(t_1)}\bigg|_{x=x_0} \\ \vdots & \vdots \\ \frac{\partial f_N}{\partial x(t_1)}\bigg|_{x=x_0} & \frac{\partial f_N}{\partial y(t_1)}\bigg|_{x=x_0} \end{bmatrix} \quad \text{Eq. 31}$$

Henceforth, it is assumed that $x_0$ is close enough to x that the linearization in equation (30) is an accurate approximation.

The solution of equation (29) may then be given by:

$$\hat{x}(t_1) = x_0 + (G^T N^{-1} G)^{-1} G^T N^{-1}(r - f(x_0)) \quad \text{Eq. 32}$$

Equation (32) gives the desired estimate of the UE 105 location at time $t_1$.

The matrix G is given by equation (31), and with equation (25) the partial derivatives are:

$$G = \begin{bmatrix} \frac{x(t_1) - x_2 + V_{x,2}}{d_2(t_1)} - \frac{x(t_1) - x_1}{d_1(t_1)} & \frac{y(t_1) - y_2 + V_{y,2}}{d_2(t_1)} - \frac{y(t_1) - y_1}{d_1(t_1)} \\ \frac{x(t_1) - x_3 + V_{x,3}}{d_3(t_1)} - \frac{x(t_1) - x_1}{d_1(t_1)} & \frac{y(t_1) - y_3 + V_{y,3}}{d_3(t_1)} - \frac{y(t_1) - y_1}{d_1(t_1)} \\ \vdots & \vdots \\ \frac{x(t_1) - x_N + V_{x,N}}{d_N(t_1)} - \frac{x(t_1) - x_1}{d_1(t_1)} & \frac{y(t_1) - y_N + V_{y,N}}{d_N(t_1)} - \frac{y(t_1) - y_1}{d_1(t_1)} \end{bmatrix} \qquad \text{Eq. 33}$$

Where $$d_k(t_1) = \sqrt{(x(t_1) - x_k + V_{x,k})^2 + (y(t_1) - y_k + V_{y,k})^2}, \qquad \text{Eq. 34}$$
$$k = 2, \ldots, N$$

and with $V_{x,k}$, $V_{y,k}$ according to equations (23) and $$d_1(t_1) = \sqrt{(x(t_1) - x_1)^2 + (y(t_1) - y_1)^2} \qquad \text{Eq. 35}$$

Equation (32) enables an iterative procedure to estimate the UE 105 location at time $t_1$ (reference base station 120-1 measurement time) even though the neighbor base station measurements are made at different times. The starting point $x_0 = (x_0, y_0)$ may be chosen based on the Cell-ID location of UE 105. With this initial guess, the UE 105 location may be calculated according to equation (32). At each new iteration, this estimated position is used as a new initial guess. The iterations will have converged when the change in the estimated position is essentially zero. This procedure may be used by a location server 160 or by the UE 105.

If the UE 105 clock is locked to the reference base station 120-1 in FIG. 5, equations (14) would be applicable instead of equations (15). A location server 160 (or the UE 105) may then solve for the location of UE 105 from equations (14) according to the equations discussed next.

As before, a two dimensional Cartesian coordinate system in the x-y plane is adopted, and the UE 105 location coordinates are denoted as (x,y) and the base station 120-$k$ coordinates are denoted as ($x_k$,$y_k$). Equations (14) can then be written as:

$$OTDOA_{2,1}(\Delta t_{2,1}) = \frac{\sqrt{(x(t_2) - x_2)^2 + (y(t_2) - y_2)^2} - \sqrt{(x(t_2) - x_1)^2 + (y(t_2) - y_1)^2}}{c} + (\varepsilon_2 - \varepsilon_1) \qquad \text{Eq. 36a}$$

$$OTDOA_{3,1}(\Delta t_{3,1}) = \frac{\sqrt{(x(t_3) - x_3)^2 + (y(t_3) - y_3)^2} - \sqrt{(x(t_3) - x_1)^2 + (y(t_3) - y_1)^2}}{c} + (\varepsilon_3 - \varepsilon_1) \qquad \text{Eq. 36b}$$

$$\vdots$$

$$OTDOA_{N,1}(\Delta t_{N,1}) = \frac{\sqrt{(x(t_N) - x_N)^2 + (y(t_N) - y_N)^2} - \sqrt{(x(t_N) - x_1)^2 + (y(t_N) - y_1)^2}}{c} + (\varepsilon_N - \varepsilon_1) \qquad \text{Eq. 36c}$$

Using measurements of instantaneous velocity and acceleration obtained by UE 105 at the time each OTDOA (or RSTD) measurement is obtained, the location of UE 105 [$x(t_i)$, $y(t_i)$] at each successive receiver measurement time $t_i$ can be determined from the location at time t1 using equations (21). However, compared to equations (22), the distance from UE 105 to the reference base station 120-1 also needs to be included due to the changing/adjustment of the UE clock to the base station 120-1 clock. This results in the following equations which replace equations (22):

$$OTDOA_{2,1}(\Delta t_{2,1}) = \frac{\sqrt{(x(t_1) - x_2 + V_{x,2})^2 + (y(t_1) - y_2 + V_{y,2})^2} - \sqrt{(x(t_1) - x_1 + V_{x,2})^2 + (y(t_1) - y_1 + V_{y,2})^2}}{c} + \eta_{2,1} \qquad \text{Eq. 37a}$$

$$OTDOA_{3,1}(\Delta t_{3,1}) = \frac{\sqrt{(x(t_1) - x_3 + V_{x,3})^2 + (y(t_1) - y_3 + V_{y,3})^2} - \sqrt{(x(t_1) - x_1 + V_{x,3})^2 + (y(t_1) - y_1 + V_{y,3})^2}}{c} + \eta_{3,1} \qquad \text{Eq. 37b}$$

$$\vdots$$

$$OTDOA_{N,1}(\Delta t_{N,1}) = \frac{\sqrt{(x(t_1) - x_N + V_{x,N})^2 + (y(t_1) - y_N + V_{y,N})^2} - \sqrt{(x(t_1) - x_1 + V_{x,N})^2 + (y(t_1) - y_1 + V_{y,N})^2}}{c} + \eta_{N,1} \qquad \text{Eq. 37c}$$

The solution of equations (37) may be according to equation (32) but with $\tilde{G}$ instead of G, given by:

$$\tilde{G} = \begin{bmatrix} \frac{x(t_1) - x_2 + V_{x,2}}{d_2(t_1)} - \frac{x(t_1) - x_1 + V_{x,2}}{d_1(t_1)} & \frac{y(t_1) - y_2 + V_{y,2}}{d_2(t_1)} - \frac{y(t_1) - y_1 + V_{y,2}}{d_1(t_1)} \\ \frac{x(t_1) - x_3 + V_{x,3}}{d_3(t_1)} - \frac{x(t_1) - x_1 + V_{x,3}}{d_1(t_1)} & \frac{y(t_1) - y_3 + V_{y,3}}{d_3(t_1)} - \frac{y(t_1) - y_1 + V_{y,3}}{d_1(t_1)} \\ \vdots & \vdots \\ \frac{x(t_1) - x_N + V_{x,N}}{d_N(t_1)} - \frac{x(t_1) - x_1 + V_{x,N}}{d_1(t_1)} & \frac{y(t_1) - y_N + V_{y,N}}{d_N(t_1)} - \frac{y(t_1) - y_1 + V_{y,N}}{d_1(t_1)} \end{bmatrix} \qquad \text{Eq. 38}$$

with $d_k(t_1)$, k=2, ..., N according to equation (34) and $$d_1(t_1) = \sqrt{(x(t_1)-x_1+V_{x,k})^2 + (y(t_1)-y_1+V_{y,k})^2}, k=2,\ldots,N \quad \text{Eq. 39}$$

It is noted that solving for the UE 105 location as just described above for FIG. 5 relies on knowing the coordinates for the base station 120 antennas, obtaining the OTDOA (RSTD) measurements for each of the neighbor cells 120-*i* from UE 105, which may be examples of location-related measurements, and obtaining from UE 105 an instantaneous velocity and instantaneous acceleration of UE 105 at each of the measurement times for the neighbor base stations 120-*i*, which may be examples of movement or velocity related measurements.

Figure 6:
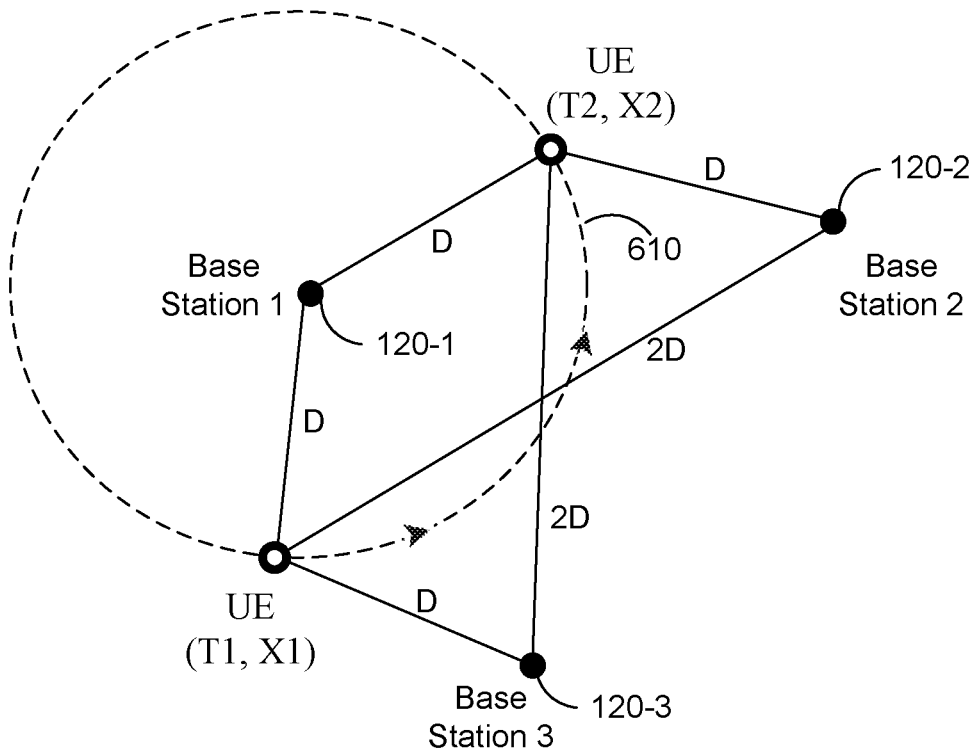
FIG. 6 is a simplified view of an example path traveled by a UE during a period of time beginning at a first time and a first location and ending at a second time and a second location.

FIG. 6 is a simplified overhead view of an example path 610 traveled by a UE 105 (not shown) during a period of time beginning at a first time, T1, and a first location, X1, and ending at a second time, T2, and a second location, X2. Similar to FIG. 5, three base stations are shown (120-1, 120-2, and 120-3). In the scenario illustrated in FIG. 6, locations X1 and X2 are equidistant from the base station 120-1 (by a distance D), but the locations vary in distance from base stations 120-2 and 120-3. In FIG. 6, the example distances are either distance D, or twice the distance (2D) as shown in FIG. 6. Of course, these distances are provided for illustrative purposes. A person of ordinary skill in the art will appreciate that the phenomena discussed in relation to FIG. 6 can be extended to other scenarios with varying distances other than those shown. In FIG. 6, it is also assumed that the 3 base stations transmit according to LTE using subframes of 1 ms in duration.

In FIG. 6, it is assumed that the timing at each base station 120 is synchronized to a common time and that UE 105 is time and frequency locked to a serving base station 120. This frequency locking may be "continuous" using certain techniques, such as, Automatic Frequency Control (AFC). In this case, UE 105 clock time may be synchronized to the time from the serving base station that is observed by UE 105 at the current location of UE 105. Therefore, when UE 105 moves closer to the serving base station, UE 105 clock time may speed up and when UE 105 moves further away from the serving base station, UE 105 clock time may slow down. Table 1 shows the consequential clock time maintained by UE 105 relative to the common base station time at the two locations X1 and X2 assuming that the distance D is 300 meters (which is the distance travelled by light in almost exactly 1 microsecond (1 μs)). It may be observed in Table 1 that UE 105 clock time does not change between locations X1 and X2 (relative to the common base station time) when the serving base station is 120-1 since the path 610 maintains a constant distance D between UE 105 and serving base station 120-1. In contrast, for a serving base station 120-2 or 120-3, UE 105 distance increases or decreases by D resulting in a change in UE 105 clock time, which may be examples of the first OTDOA error described earlier herein.

Tables 2 and 3 provide examples of the TOA measured by UE 105 (using the UE 105 clock time as obtained from the serving base station) for each of the three base stations 120-1, 120-2 and 120-2 and when the serving base station (and time source) for UE 105 is base station 120-1 and 120-2, respectively. The TOA measured by UE 105 is affected by both the distance between the measured base station and the location of UE 105 when the TOA is measured and the UE 105 clock time. It may be observed that the TOAs are not the same for each serving base station which may be another example of the first OTDOA error described previously. In addition, the TOAs are different for the two locations X1 and X2 which may be an example of the second OTDOA error referred to herein previously.

TABLE 1

UE clock in μs (mod 1 ms) relative to Base Station Time - UE locked to serving Base Station

| Serving Base Station | UE at X1 | UE at X2 |
|---|---|---|
| Base Station 120-1 | −1 | −1 |
| Base Station 120-2 | −2 | −1 |
| Base Station 120-3 | −1 | −2 |

TABLE 2

UE TOA Measurement of Base Station 1 ms boundaries - with serving Base Station 120-1

| Source Base Station | UE at X1 | UE at X2 |
|---|---|---|
| Base Station 120-1 | 0 | 0 |
| Base Station 120-2 | 1 | 0 |
| Base Station 120-3 | 0 | 1 |

TABLE 3

UE TOA Measurement of Base Station 1 ms boundaries - with serving base station 120-2

| Source Base Station | UE at X1 | UE at X2 |
|---|---|---|
| Base Station 120-1 | −1 | 0 |
| Base Station 120-2 | 0 | 0 |
| Base Station 120-3 | −1 | 1 |

In implementation, the techniques described above in relation to FIGS. 2-6 may be enabled by supporting movement or velocity related measurements in a positioning protocol such as LPP, LPPe or NPP. Possible movement or velocity related measurements may include an average velocity, average change in velocity, straight line distance moved, a duration of UE 105 movement (or duration of location-related measurements), and/or a timestamp, an instantaneous velocity, instantaneous acceleration and/or a relative location for UE 105 at each time that a location-related measurement (e.g. a TOA or RSTD) is obtained by UE 105. A relative location for UE 105 may, for example be relative to an initial location for UE 105 when UE 105 obtains a first location-related measurement or may be relative to a location for UE 105 when some other location-related measurement is obtained such as a TOA measurement for a reference cell for OTDOA location. A timestamp may be a time based on timing observed by UE 105 from a serving cell or a reference cell for OTDOA—e.g. may include a system frame number, radio frame number and/or subframe number in the case of a serving cell or reference cell for LTE. Movement or velocity related measurements may also indicate whether UE 105 is using a base station or cell to determine UE 105 timing (e.g. via frequency lock loop) and may provide the identity of the base station or cell and/or may indicate whether the base station or cell is a serving base station or cell or a reference base station or cell for OTDOA. Movement or velocity related measurements may further indicate whether UE 105 is using some other time source to determine UE 105 time such as an internal time source (e.g. crystal oscillator) or GPS or GNSS time and/or whether UE 105 may have changed a time source during a period of location-related measurements (e.g. due to UE 105 changing a serving cell during a period of location-related measurements). In an embodiment, UE 105 may provide path or trajectory information for a duration of location-related measurements in other ways such as by providing trajectory information using a polynomial function of time where the UE 105 provides the coefficients for the polynomial. For example for a second degree polynomial, this may be equivalent to providing an average velocity and an average acceleration.

Figure 7:
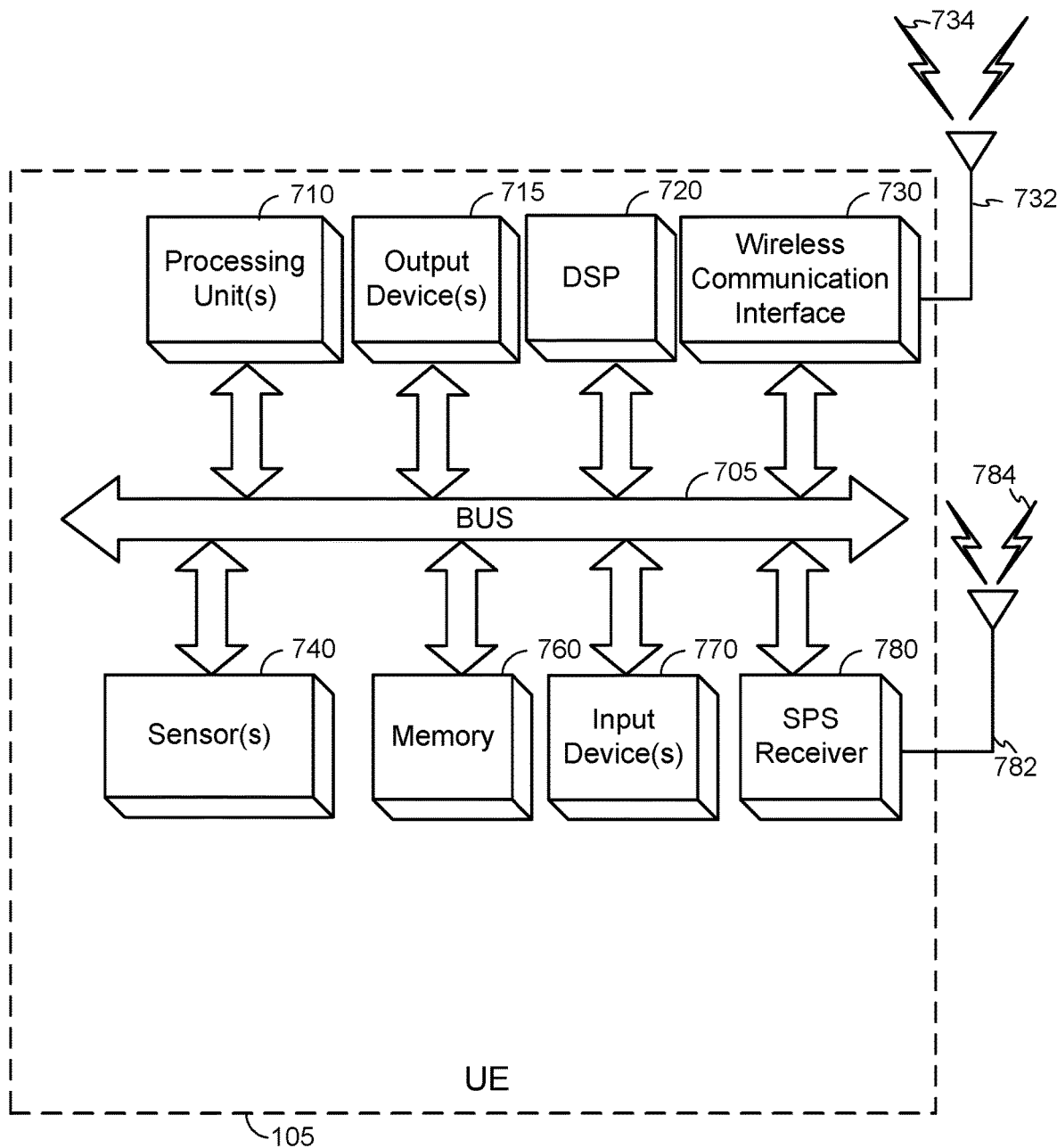
FIG. 7 is a block diagram of an embodiment of a UE.

FIG. 7 illustrates an embodiment of a UE 105, which can be utilized as described in the embodiments provided above and as described in FIGS. 1-6. It should be noted that FIG. 7 is meant only to provide a generalized illustration of various components of UE 105, any or all of which may be utilized as appropriate. In other words, because UEs can vary widely in functionality, they may include only a portion of the components shown in FIG. 7. It can be noted that, in some instances, components illustrated y FIG. 7 can be localized to a single physical device and/or distributed among various networked devices, which may be disposed at different physical locations.

The UE 105 is shown comprising hardware elements that can be electrically coupled via a bus 705 (or may otherwise be in communication, as appropriate). The hardware elements may include a processing unit(s) 710 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 7, some embodiments may have a separate DSP 720, depending on desired functionality. The UE 105 also may comprise one or more input devices 770, which may comprise without limitation one or more touch screens, touch pads, microphones, buttons, dials, switches, and/or the like; and one or more output devices 715, which may comprise without limitation, one or more displays, light emitting diode (LED)s, speakers, and/or the like.

The UE 105 might also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMax device, cellular communication facilities, etc.), and/or the like, which may enable to UE 105 to communicate via the networks described above with regard to FIG. 1. The wireless communication interface 730 may permit data to be communicated with a network, an LS, wireless access points, other computer systems, and/or any other electronic devices described herein. The communication can be carried out via one or more wireless communication antenna(s) 732 that send and/or receive wireless signals 734.

Depending on desired functionality, the wireless communication interface 730 may comprise separate transceivers to communicate with base stations (e.g., base stations 120 of FIG. 1) and other terrestrial transceivers, such as wireless devices and access points (e.g., APs 130 of FIG. 1), which may be part of a wireless wide area network (WWAN) or a wireless local area network (WLAN). For example, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, NR and so on. LTE, LTE Advanced, NR, GSM, and W-CDMA are described (or are being described) in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 740. Such sensors may comprise, without limitation, one or more inertial sensors (e.g., accelerometer(s), gyroscope(s), compass, magnetometer(s)) which may also be referred to as Inertial Measurement Units (IMUs), capable of obtaining movement or velocity-related measurements as described herein. The UE 105 may include additional sensors, such as camera(s), altimeter(s), barometer, thermometer, hygrometer, microphone(s), proximity sensor(s), light sensor(s), and the like, some of which may also provide information pertaining to the movement or velocity-related and/or location-related measurements described herein.

Embodiments of UE 105 may also include a GNSS receiver 780 capable of receiving signals 784 from one or more GNSS satellites using a GNSS antenna 782 (which may be combined with antenna 732 in some implementations). Such positioning can be utilized to complement and/or incorporate the techniques described herein. The GNSS receiver 780 can receive, measure and/or decode RF signals from GNSS SVs of a GNSS system, such as GPS, Galileo, GLONASS, Quasi-Zenith Satellite System (QZSS) over Japan, Indian Regional Navigational Satellite System (IRNSS) over India, Beidou over China, and/or other such satellite positioning systems. Moreover, the GNSS receiver 780 can be used to receive, measure and/or decode RF signals from various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 105 may further include and/or be in communication with a memory 760. The memory 760 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. This memory 760 may be used, among other things, to store the AD using a database, linked list, or any other type of data structure. In some embodiments, wireless communication interface 730 may additionally or alternatively comprise memory.

The memory 760 of UE 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed herein might be implemented as code and/or instructions executable by UE 105 (and/or a processing unit within UE 105). In an aspect, then, such code and/or instructions can be used to configure and/or adapt a general purpose computer (or other device) to perform one or more operations in accordance with the described methods.

Figure 8:
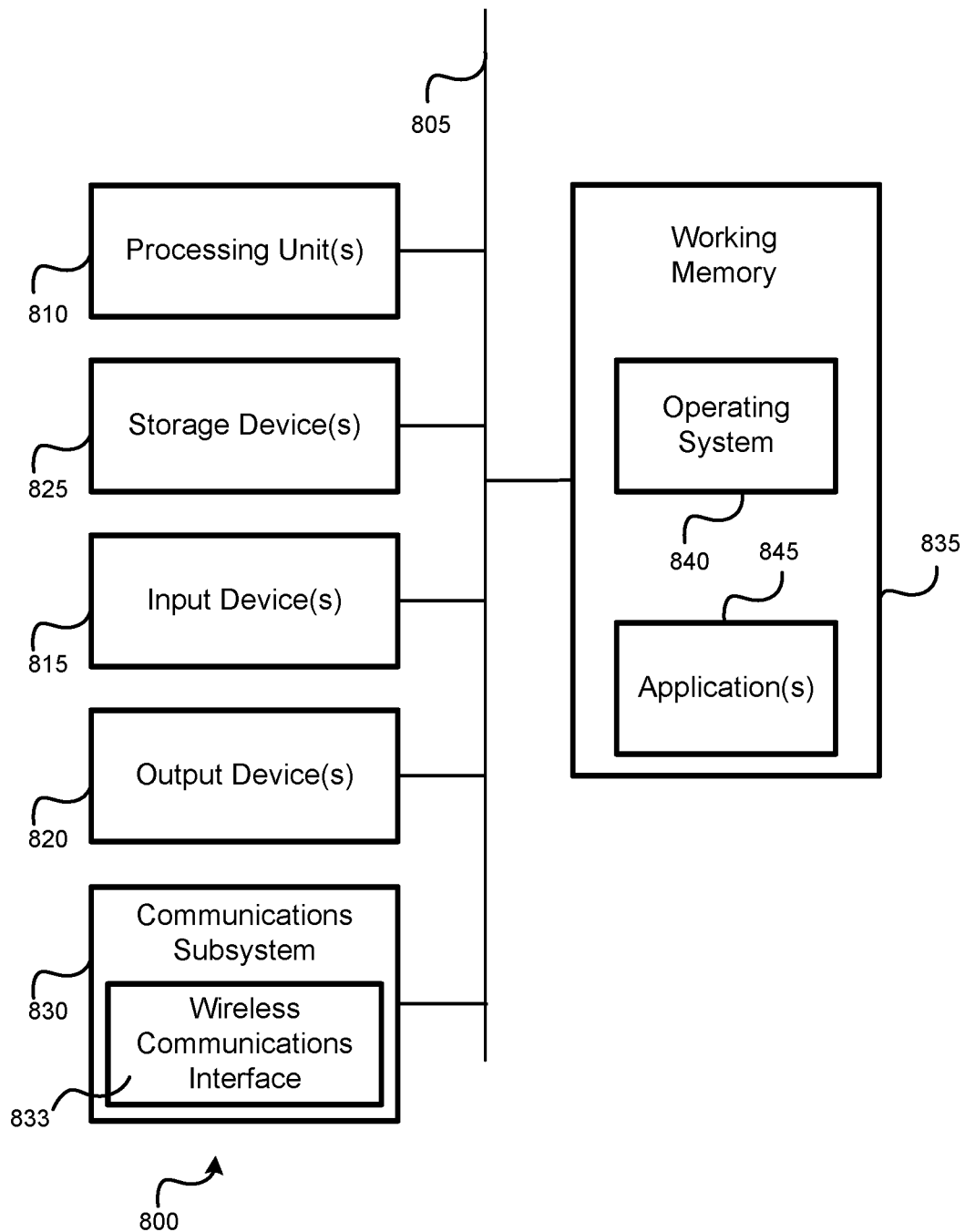
FIG. 8 is a block diagram of an embodiment of a computer system.

FIG. 8 illustrates an embodiment of a computer system 800, which may be used, in whole or in part, to provide the functions of an LS as described in the embodiments above (e.g., LS 160 of FIGS. 1 and 4). It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different geographical locations.

The computer system 800 is shown comprising hardware elements that can be electrically coupled via a bus 805 (or may otherwise be in communication, as appropriate). The hardware elements may include processing unit(s) 810, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 800 also may comprise one or more input devices 815, which may comprise without limitation a mouse, a keyboard, a camera, a microphone, and/or the like; and one or more output devices 820, which may comprise without limitation a display device, a printer, and/or the like.

The computer system 800 may further include (and/or be in communication with) one or more non-transitory storage devices 825, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 800 might also include a communications subsystem 830, which may comprise wireless communication technologies managed and controlled by a wireless communication interface 833, as well as wired technologies (such as Ethernet, coaxial communications, universal serial bus (USB), and the like). Thus, the communications subsystem 830 may comprise a modem, a network card (wireless or wired), an infrared communication device, a wireless communication device, and/or a chipset, and/or the like, which may enable the computer system 800 to communicate on any or all of the communication networks described herein to any device on the respective network, including a UE (e.g. UE 105), other computer systems, and/or any other electronic devices described herein. Hence, the communications subsystem 830 may be used to receive and send data as described in the embodiments herein.

In many embodiments, the computer system 800 will further comprise a working memory 835, which may comprise a RAM or ROM device, as described above. Software elements, shown as being located within the working memory 835, may comprise an operating system 840, device drivers, executable libraries, and/or other code, such as one or more applications 845, which may comprise computer programs provided by various embodiments, and/or may be designed to implement methods, and/or configure systems, provided by other embodiments, as described herein. Merely by way of example, one or more procedures described with respect to the method(s) discussed herein might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

Figure 9:
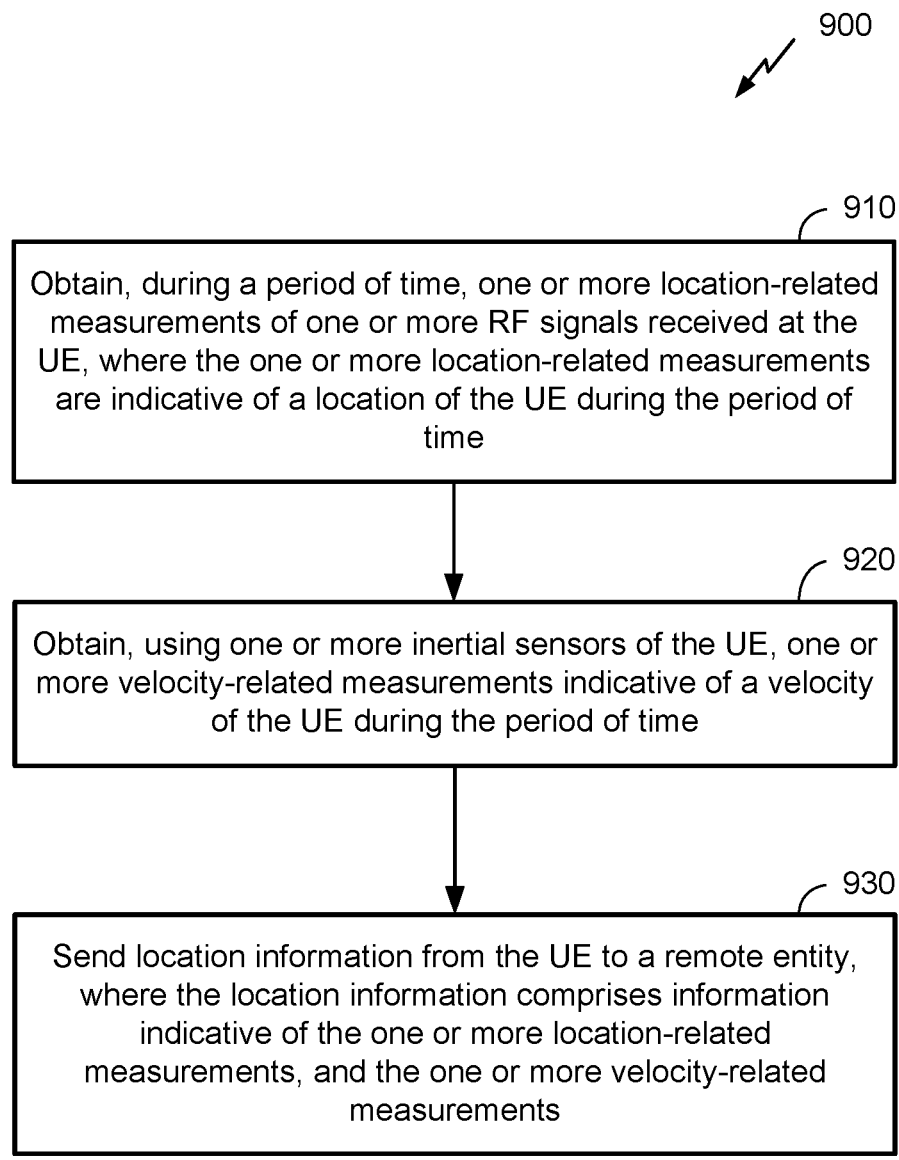
FIG. 9 is a flow diagram of a method of determining a location of a UE that may be performed by a UE, according to an embodiment.

FIG. 9 is a flow diagram illustrating a method 900 of determining a location of a UE, according to an embodiment. It can be noted that, as with figures appended hereto, FIG. 9 is provided as a non-limiting example. Other embodiments may vary, depending on desired functionality. For example, the functional blocks illustrated in method 900 may be combined, separated, or rearranged to accommodate different embodiments. The method 900 may be performed by a UE such as UE 105. Means for performing the functionality of method 900 may include hardware and/or software means of a UE, such as UE 105 shown in FIG. 7 and described above.

The functionality at block 910 includes obtaining, during a period of time, one or more location-related measurements of one or more Radio Frequency (RF) signals received at the UE, where the one or more location-related measurements are indicative of a location of the UE during the period of time. The functionality at block 910 (and subsequent functions) may be in response to the UE receiving a request for location-related and velocity-related measurements (including movement related measurements) from a location server (e.g. the location server 160). As previously noted, the types of RF signals and location-related measurements may vary, depending on the wireless technology used, the RF signals detected, and/or other factors. RF signals may include, for example, a Positioning Reference Signal (PRS) transmitted by a base station (e.g. a base station 120), a Cell-specific Reference Signal (CRS) transmitted by a base station, and/or a navigation signal transmitted by a Satellite Vehicle (SV) (e.g. a GNSS Satellite 110). The location-related measurements may comprise, for example, an observed time difference of arrival (OTDOA), a Reference Signal Time Difference (RSTD) (e.g. between PRS signals from a pair of base stations), a time of arrival (TOA), a round trip signal propagation time (RTT) (e.g. between the UE and a serving base station), a pseudorange (e.g. for a navigation signal from a GNSS satellite), an angle of arrival (AOA), and/or a received signal strength indication (RSSI). Block 910 may correspond to block 440 in signaling flow 400.

Means for performing the functionality at block 910 can include, for example, processing unit(s) 710, bus 705, memory 760, wireless communication interface 730, wireless communication antenna(s) 732, GNSS receiver 780, GNSS antenna 782, and/or other hardware and/or software components of UE 105 as shown in FIG. 7 and described above.

The functionality at block 920 includes obtaining, using one or more inertial sensors (or other sensors) of the UE (e.g. accelerometers, gyroscopes, compass, barometer), one or more velocity-related measurements (which may include movement related measurements) indicative of a velocity (or movement) of the UE during the period of time. The information indicative of the one or more velocity-related measurements may include an indication of a straight line distance traveled by the UE during the period of time, an average velocity for the UE during the period of time, a change in velocity for the UE during the period of time, an initial velocity for the UE at the beginning of the period of time, a final velocity for the UE at the end of the period of time, an instantaneous velocity for the UE during the period of time, an instantaneous acceleration for the UE during the period of time, a trajectory for the UE during the period of time (e.g. a sequence of relative locations for the UE and a time or timestamp for each relative location), and/or other velocity-related information for the UE during the period of time. In an aspect, the indication of the straight-line distance may comprise a velocity vector. In another aspect, the indication of the change in velocity of the UE during the period of time may comprise an indication of a difference between a velocity of the UE at the beginning of the period of time and a velocity of the UE at the end of the period of time. In a further aspect, the indication of an instantaneous velocity for the UE during the period of time and/or the indication of an instantaneous acceleration for the UE during the period of time are for a time at which a location-related measurement of the one or more location-related measurements was obtained at block 910. Block 920 may correspond to block 440 in signaling flow 400.

Means for performing the functionality at block 920 can include, for example, processing unit(s) 710, bus 705, memory 760, sensor(s) 740, and/or other hardware and/or software components of UE 105 as shown in FIG. 7 and described above.

The functionality at block 930 includes sending location information from the UE to a remote entity, where the location information comprises information indicative of the one or more location-related measurement obtained at block 910, and the one or more velocity-related measurements obtained at block 920. In some embodiments, the remote entity may comprise a location server, such as location server 160, an E-SMLC, a SUPL SLP or an LMF. In an aspect, the information indicative of the one or more location-related measurements sent at block 930 further comprises at least one of the period of time, a time at which each location-related measurement of the one or more location-related measurements was obtained, or an indication of a time source for the UE during the period of time. In this aspect, the indication of the time source for the UE during the period of time may be an indication of a serving cell for the UE or an indication of a reference cell for the UE (e.g. a reference cell for OTDOA). For example, as described in association with FIGS. 5 and 6, the UE may be time and frequency locked to the serving cell or reference cell to enable the UE to lock a UE clock time to the time observed by the UE from the serving cell or reference cell.

In some embodiments, the information indicative of the one or more location-related measurements sent at block 930 may be based on an assumption by the UE that the UE is stationary during the period of time. Block 930 may correspond to action 445 in signaling flow 400.

Means for performing the functionality at block 930 can include, for example, processing unit(s) 710, bus 705, memory 760, wireless communication interface 730, wireless communication antenna(s) 732, and/or other hardware and/or software components of the UE 105 as shown in FIG. 7 and described above.

According to some embodiments, the method 900 may further comprise receiving an estimated location of the UE from the remote entity in response to sending the location information from the UE to the remote entity. According to some embodiments, the method 900 may further comprise obtaining the one or more location-related measurements and the one or more velocity-related measurements at blocks 910 and 920 in response to receiving, at the UE, a request for the one or more location-related measurements and the one or more velocity-related measurements from the remote entity. In some embodiments, the UE sends the location information to the remote entity at block 930 using an LPP, LPP/LPPe or NPP protocol.

Figure 10:
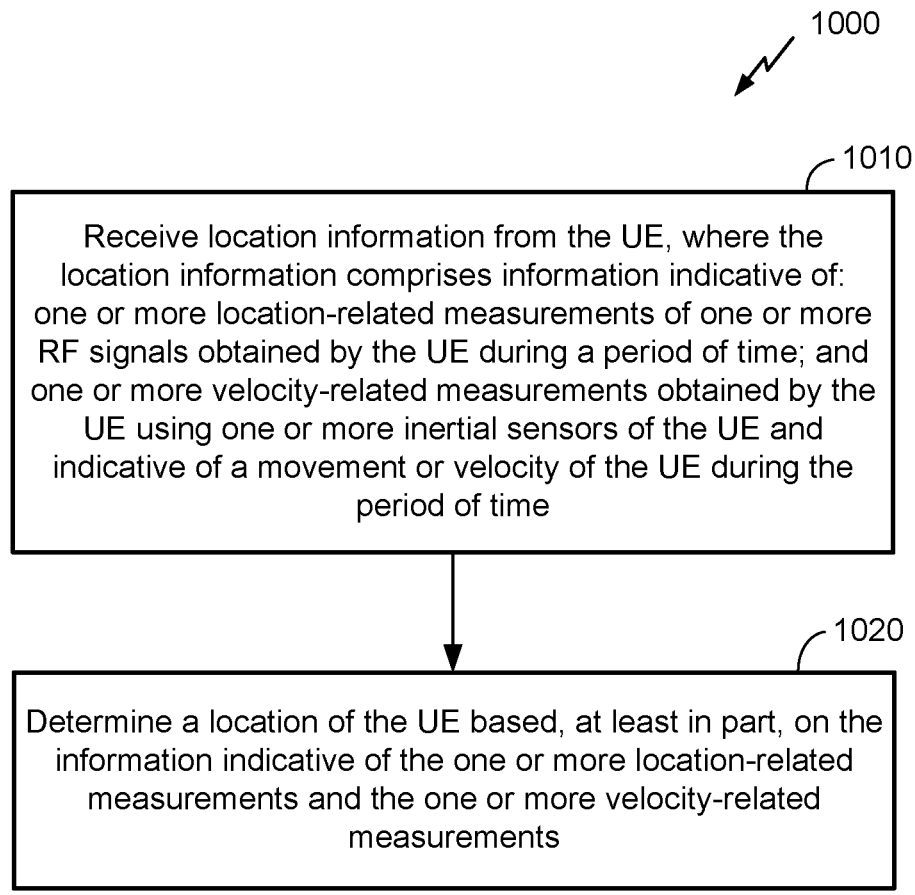
FIG. 10 is a flow diagram of a method of determining a location of a UE that may be performed by a location server, according to an embodiment.

FIG. 10 is a flow diagram illustrating a method 1000 of determining a location of a UE (e.g. UE 105), according to an embodiment. Again, FIG. 10 is provided as a non-limiting example, and a person of ordinary skill in the art will appreciate that other embodiments may vary from the method 1000 as shown. The method 1000 may be performed by a location server such as the location server 160 (e.g. which may be an E-SMLC, SUPL SLP or LMF). Means for performing the functionality of method 1000 may include hardware and/or software means of a computer system, such as the computer system 800 shown in FIG. 8 and described above.

The functionality at block 1010 includes receiving location information from the UE, where the location information comprises information indicative of one: or more location-related measurements of one or more RF signals obtained by the UE during a period of time; and one or more velocity-related measurements obtained by the UE (which, again, may include movement related measurements) using one or more inertial sensors of the UE and indicative of a velocity (or movement) of the UE during the period of time. As previously noted, the types of RF signals and location information may vary, depending on the wireless technology used, the RF signals detected, and/or other factors. RF signals may include, for example, a Positioning Reference Signal (PRS) transmitted by a base station (e.g. a base station 120), a Cell-specific Reference Signal (CRS) transmitted by a base station, and/or a navigation signal transmitted by a Satellite Vehicle (SV) (e.g. a GNSS Satellite 110). The location-related measurements may comprise, for example, an observed time difference of arrival (OTDOA), a Reference Signal Time Difference (RSTD) (e.g. between PRS signals from a pair of base stations), a time of arrival (TOA), a round trip signal+propagation time (RTT) (e.g. between the UE and a serving base station) and/or a pseudorange (e.g. for a navigation signal from a GNSS satellite).

The information indicative of the one or more velocity-related measurements received at block 1010 may include an indication of: a straight line distance traveled by the UE during the period of time, an average velocity for the UE during the period of time, a change in velocity for the UE during the period of time, an initial velocity for the UE at the beginning of the period of time, a final velocity for the UE at the end of the period of time, an instantaneous velocity for the UE during the period of time, an instantaneous acceleration for the UE during the period of time, a trajectory for the UE during the period of time (e.g. a sequence of relative locations for the UE and a time or timestamp for each relative location), and/or other velocity related information for the UE during the period of time. In an aspect, the indication of the straight-line distance may comprise a velocity vector. In another aspect, the indication of a change in velocity of the UE during the period of time may comprise an indication of a difference between a velocity of the UE at the beginning of the period of time and a velocity of the UE at the end of the period of time. In a further aspect, the indication of an instantaneous velocity for the UE during the period of time and/or the indication of an instantaneous acceleration for the UE during the period of time are for a time at which a location-related measurement of the one or more location-related measurements was obtained by the UE.

Block 1010 may correspond to action 445 in signaling flow 400.

The functionality at block 1020 includes determining a location of the UE based, at least in part, on the location information received at block 1010 such as the information indicative of the one or more location-related measurements and the one or more velocity-related measurements received at block 1010. For example, the location determination may employ one or more of the techniques described previously herein in association with FIGS. 1-6 and equations (1) to (35). In some embodiments, determining the UE location at block 1020 may include: (i) extrapolating the location of the UE for a previous time to a current or future time (e.g. as described in association with FIG. 2); (ii) including (e.g. receiving or determining) relative locations of the UE when different location-related measurements were obtained (e.g. as described in association with equations (1) to (35) and FIG. 5); (iii) including (e.g. determining) relative changes in timing for the UE based on movement towards or away from a time source (e.g. as described for FIG. 6 and in association with the first OTDOA error described previously); and/or (iv) calculating an expected error or uncertainty in the location for the UE.

In some embodiments, the information indicative of the one or more location-related measurements received at block 1010 further comprises timing information, comprising at least one of the period of time, a time at which each location-related measurement of the one or more location-related measurements was obtained by the UE, and/or an indication of a time source for the UE during the period of time. In this embodiment, determining the location of the UE at block 1020 may be further based, at least in part, on the timing information. In this embodiment, the indication of the time source for the UE during the period of time may be an indication of a serving cell for the UE or an indication of a reference cell for the UE (e.g. a reference cell for OTDOA). For example, as described in association with FIGS. 5 and 6, the UE may be frequency locked to the serving cell or reference cell to enable the UE to lock a UE clock time to the time observed by the UE from the serving cell or reference cell.

Additional or alternative functionality may be implemented, depending on desired functionality. For example, in some embodiments, the location server may send a request to the UE for the information indicative of the one or more location-related measurements and the one or more movement or velocity-related measurements. Additionally or alternatively, the location server may send the location of the UE to the UE. In some embodiments, the location server receives the location information from the UE at block 1010 using an LPP, LPP/LPPe or NPP protocol.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

As noted above, attached hereto is an Appendix comprising a draft 3GPP contribution. It describes one or more features that may be included in embodiments, depending on desired functionality.

What is claimed is:

1. A method of providing information for determining a location of a user equipment (UE), the method comprising:
   in response to receiving a Request Location Information message from a location server in accordance with Long Term Evolution (LTE) Positioning Protocol (LPP) or New Radio (NR) Positioning Protocol (NPP):
      obtaining at the UE, during a period of time, a plurality of location-related measurements of one or more Radio Frequency (RF) signals received at the UE, wherein:
         the one or more RF signals comprises a positioning reference signal (PRS) or a Cell-specific Reference Signal (CRS) transmitted by a base station, and
         the one or more location-related measurements are indicative of a location of the UE during the period of time; and
      obtaining, using one or more inertial sensors of the UE, one or more velocity-related measurements indicative of a velocity of the UE when each measurement of the plurality of measurements was taken; and
   sending location information from the UE to the location server using LPP, LPP and LPP Extensions (LPP/LPPe), or NPP protocol, wherein the location information comprises information indicative of:
      the one or more location-related measurements, and
      the one or more velocity-related measurements.

2. The method of claim 1, wherein the information indicative of the one or more velocity-related measurements comprises an indication of at least one of:
   a straight-line distance traveled by the UE during the period of time,
   an average velocity for the UE during the period of time,
   a change in velocity for the UE during the period of time, an initial velocity for the UE at the beginning of the period of time, a final velocity for the UE at the end of the period of time, an instantaneous velocity for the UE during the period of time, an instantaneous acceleration for the UE during the period of time, or a trajectory for the UE during the period of time, or any combination thereof.

3. The method of claim 2, wherein the indication of the straight-line distance comprises a velocity vector.

4. The method of claim 2, wherein the indication of the change in velocity of the UE during the period of time comprises an indication of a difference between a velocity of the UE at the beginning of the period of time and a velocity of the UE at the end of the period of time.

5. The method of claim 2, wherein the indication of an instantaneous velocity for the UE during the period of time and the indication of an instantaneous acceleration for the UE during the period of time are for a time at which a location-related measurement of the one or more location-related measurements was obtained.

6. The method of claim 1, wherein the information indicative of the one or more location-related measurements further comprises at least one of the period of time, a time at which each location-related measurement of the one or more location-related measurements was obtained, or an indication of time source for the UE during the period of time.

7. The method of claim 6, wherein the indication of the time source for the UE during the period of time comprises an indication of a serving cell for the UE or an indication of a reference cell for the UE.

8. The method of claim 1, wherein the one or more location-related measurements comprise measurements of an observed time difference of arrival (OTDOA), a reference signal time difference (RSTD), a time of arrival (TOA), a round trip signal propagation time (RTT), a pseudorange, an angle of arrival (AOA), a received signal strength indication (RSSI), or any combination thereof.

9. A method of determining a location of a user equipment (UE), the method comprising:

sending, in accordance with Long Term Evolution (LTE) Positioning Protocol (LPP) or New Radio (NR) Positioning Protocol (NPP), a Request Location Information message from a location server to the UE;

receiving, at the location server in response to the Request Location Information message, location information from the UE sent using LPP, LPP and LPP Extensions (LPP/LPPe), or NPP protocol, wherein the location information comprises information indicative of:

one or more location-related measurements of one or more Radio Frequency (RF) signals obtained by the UE during a period of time, wherein the one or more RF signals comprises a positioning reference signal (PRS) or a Cell-specific Reference Signal (CRS) transmitted by a base station, and one or more velocity-related measurements obtained by the UE using one or more inertial sensors of the UE and indicative of a velocity of the UE when the one or more location-related measurements were taken; and determining, by the location server, a location of the UE based, at least in part, on the information indicative of the one or more location-related measurements, wherein determining the location comprises determining, based on the one or more velocity-related measurements:

an estimated location of the UE subsequent to when the one or more location- related measurements were taken, an approximate location of the UE for each measurement of the one or more location-related measurements, an expected error or uncertainty in the location, or any combination thereof.

10. The method of claim 9, wherein the information indicative of the one or more velocity-related measurements comprises an indication at least one of:

a straight-line distance traveled by the UE during the period of time, an average velocity for the UE during the period of time, a change in velocity for the UE during the period of time, an initial velocity for the UE at the beginning of the period of time, a final velocity for the UE at the end of the period of time, an instantaneous velocity for the UE during the period of time, an instantaneous acceleration for the UE during the period of time, a trajectory for the UE during the period of time, or some combination thereof.

11. The method of claim 10, wherein the indication of the straight-line distance comprises a velocity vector.

12. The method of claim 10, wherein the indication of a change in velocity of the UE during the period of time comprises an indication of a difference between a velocity of the UE at the beginning of the period of time and a velocity of the UE at the end of the period of time.

13. The method of claim 10, wherein the indication of an instantaneous velocity for the UE during the period of time and the indication of an instantaneous acceleration for the UE during the period of time are for a time at which a location-related measurement of the one or more location-related measurements was obtained by the UE.

14. The method of claim 9, wherein the information indicative of the one or more location-related measurements further comprises timing information, comprising at least one of the period of time, a time at which each location-related measurement of the one or more location-related measurements was obtained by the UE, or an indication of a time source for the UE during the period of time, and wherein determining the location of the UE is further based, at least in part, on the timing information.

15. The method of claim 9, wherein determining the location comprises:

extrapolating the location of the UE for a previous time to a current time;

including relative changes in timing for the UE based on movement towards or away from a time source;

performing any combination thereof.

16. The method of claim 9, wherein the one or more location-related measurements comprise measurements of an observed time difference of arrival (OTDOA), a reference signal time difference (RSTD), a time of arrival (TOA), a round trip signal propagation time (RTT), a pseudorange, an angle of arrival (AOA), a received signal strength indication (RSSI), or any combination thereof.

17. A user equipment (UE) comprising:
a wireless communication interface;
one or more inertial sensors; and
one or more processing units communicatively coupled with the wireless communication interface and the one or more inertial sensors and configured to cause the UE to:
  in response to receiving a Request Location Information message from a location server in accordance with Long Term Evolution (LTE) Positioning Protocol (LPP) or New Radio (NR) Positioning Protocol (NPP):
    obtain, via the wireless communication interface during a period of time, a plurality of location-related measurements of one or more Radio Frequency (RF) signals, wherein:
      the one or more RF signals comprises a positioning reference signal (PRS) or a Cell-specific Reference Signal (CRS) transmitted by a base station, and
      the one or more location-related measurements indicative of a location of the UE during the period of time; and
    obtain, using the one or more inertial sensors, one or more velocity-related measurements indicative of a velocity of the UE when each measurement of the plurality of measurements was taken; and
    send location information via the wireless communication interface to the location server using LPP, LPP and LPP Extensions (LPP/LPPe), or NPP protocol, wherein the location information comprises information indicative of:
      the one or more location-related measurements, and
      the one or more velocity-related measurements.

18. The UE of claim 17, wherein the information indicative of the one or more velocity-related measurements includes an indication of at least one of:
a straight-line distance traveled by the UE during the period of time,
an average velocity for the UE during the period of time,
a change in velocity for the UE during the period of time,
an initial velocity for the UE at the beginning of the period of time,
a final velocity for the UE at the end of the period of time,
an instantaneous velocity for the UE during the period of time,
an instantaneous acceleration for the UE during the period of time, or
a trajectory for the UE during the period of time,
or any combination thereof.

19. The UE of claim 18, wherein the indication of the straight-line distance includes a velocity vector.

20. The UE of claim 18, wherein the indication of the change in velocity of the UE during the period of time includes an indication of a difference between a velocity of the UE at the beginning of the period of time and a velocity of the UE at the end of the period of time.

21. The UE of claim 17, wherein the information indicative of the one or more location-related measurements includes at least one of the period of time, a time at which each location-related measurement of the one or more location-related measurements was obtained, or an indication of time source for the UE during the period of time.

22. The UE of claim 21, wherein the indication of the time source for the UE during the period of time includes an indication of a serving cell for the UE or an indication of a reference cell for the UE.

23. A location server comprising:
a communication interface;
a memory; and
one or more processing units communicatively coupled with the communication interface and the memory and configured to cause the location server to:
  send, in accordance with Long Term Evolution (LTE) Positioning Protocol (LPP) or New Radio (NR) Positioning Protocol (NPP), a Request Location Information message from a location server to the UE;
  receive, via the communication interface in response to the Request Location Information message, location information from a user equipment (UE) sent using LPP, LPP and LPP Extensions (LPP/LPPe), or NPP protocol, wherein the location information comprises information indicative of:
    one or more location-related measurements of one or more Radio Frequency (RF) signals obtained by the UE during a period of time, wherein the one or more RF signals comprises a positioning reference signal (PRS) or a Cell-specific Reference Signal (CRS) transmitted by a base station, and
    one or more velocity-related measurements obtained by the UE using one or more inertial sensors of the UE and indicative of a velocity of the UE during when the one or more location-related measurements were taken; and
  determine a location of the UE based, at least in part, on the information indicative of the one or more location-related measurements, wherein determining the location comprises determining, based on the one or more velocity-related measurements:
    an estimated location of the UE subsequent to when the one or more location- related measurements were taken,
    an approximate location of the UE for each measurement of the one or more location-related measurements,
    an expected error or uncertainty in the location,
    or any combination thereof.

24. The location server of claim 23, wherein the information indicative of the one or more velocity-related measurements comprises an indication of at least one of:
a straight-line distance traveled by the UE during the period of time,
an average velocity for the UE during the period of time,
a change in velocity for the UE during the period of time,
an initial velocity for the UE at the beginning of the period of time,
a final velocity for the UE at the end of the period of time,
an instantaneous velocity for the UE during the period of time,
an instantaneous acceleration for the UE during the period of time,
a trajectory for the UE during the period of time,
or any combination thereof.

25. The location server of claim 23, wherein the one or more processing units are configured to determine the location of the UE further based on timing information included in the information indicative of the one or more location-related measurements, the timing information comprising at least one of the period of time, a time at which each location-related measurement of the one or more location-related measurements was obtained by the UE, or an indication of a time source for the UE during the period of time.

26. The location server of claim 23, wherein the one or more processing units are configured to determine the location of the UE by being further configured to:
- extrapolate the location of the UE for a previous time to a current time;
- include relative changes in timing for the UE based on movement towards or away from a time source;
- perform any combination thereof.

27. The location server of claim 23, wherein the one or more processing units is further configured to cause the location server to determine the location of the UE from an observed time difference of arrival (OTDOA), a reference signal time difference (RSTD), a time of arrival (TOA), a round trip signal propagation time (RTT), a pseudorange, an angle of arrival (AOA), a received signal strength indication (RSSI), or any combination thereof.

* * * * *